United States Patent
Katoh et al.

(10) Patent No.: US 7,746,789 B2
(45) Date of Patent: Jun. 29, 2010

(54) ROUTING CONTROL METHOD, APPARATUS AND SYSTEM

(75) Inventors: Masafumi Katoh, Kawasaki (JP); Tsuguo Kato, Kawasaki (JP); Hitoshi Yamada, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 1052 days.

(21) Appl. No.: 11/390,411

(22) Filed: Mar. 28, 2006

(65) Prior Publication Data

US 2007/0195700 A1  Aug. 23, 2007

(30) Foreign Application Priority Data

Sep. 20, 2005 (JP) .............................. 2005-272410
Jan. 17, 2006 (JP) .............................. 2006-008551

(51) Int. Cl.
  *H04J 3/14* (2006.01)
(52) U.S. Cl. ...................... 370/238; 370/235; 370/400; 370/401; 709/226; 709/238
(58) Field of Classification Search ................. 370/229, 370/230, 231, 232, 352, 360, 389, 395.2, 370/397, 401, 417, 468, 238, 355, 400; 709/226, 709/227, 228, 240, 241, 242, 244
See application file for complete search history.

(56) References Cited

U.S. PATENT DOCUMENTS

| | | | | |
|---|---|---|---|---|
| 5,408,465 A | * | 4/1995 | Gusella et al. ............... | 370/231 |
| 5,583,860 A | * | 12/1996 | Iwakawa et al. ............. | 370/232 |
| 5,884,037 A | * | 3/1999 | Aras et al. ................... | 709/226 |
| 6,175,554 B1 | * | 1/2001 | Jang et al. .................... | 370/229 |
| 6,411,946 B1 | * | 6/2002 | Chaudhuri .................... | 706/21 |
| 6,771,648 B1 | * | 8/2004 | Kim et al. ................. | 370/395.2 |

(Continued)

FOREIGN PATENT DOCUMENTS

JP          10-135974          5/1998

(Continued)

OTHER PUBLICATIONS

Kun-chan Lan et al., "Effect of Malicious Traffic on the Network", Proceeding of PAM, Apr. 6-8, 2003, pp. 1-8.

(Continued)

*Primary Examiner*—Aung S Moe
*Assistant Examiner*—Abdullah Riyami
(74) *Attorney, Agent, or Firm*—Staas & Halsey LLP

(57) ABSTRACT

This invention is to enable appropriate routing based on transition prediction of network traffic. This routing control method includes: reading out predicted utilization transition data (e.g. utilization rate, or utilized bandwidth) associated with a received connection set-up request from a predicted utilization transition data storage storing said predicted utilization transition data for each resource (e.g. links between routers, or server) in a network in future; and selecting a resource satisfying a predetermined condition based on the read predicted utilization transition data. Thus, by using said predicted utilization transition data, an appropriate resource is identified in accordance with future time transition of the resource utilization rate, for example, and thereby, appropriate routing is possible. For example, when a link that a traffic volume will increase after a predetermined time exists, it is possible to judge that such a link is not used even when there are a lot of available bandwidths now.

22 Claims, 23 Drawing Sheets

U.S. PATENT DOCUMENTS

| | | | |
|---|---|---|---|
| 6,917,590 B1* | 7/2005 | Oliva | 370/232 |
| 7,197,573 B1* | 3/2007 | Jacobson et al. | 709/239 |
| 7,403,988 B1* | 7/2008 | Blouin et al. | 709/223 |
| 7,477,901 B2* | 1/2009 | Weston et al. | 455/453 |
| 7,542,420 B1* | 6/2009 | Mokhtar et al. | 370/235 |
| 2001/0037401 A1 | 11/2001 | Soumiya et al. | |
| 2003/0009582 A1* | 1/2003 | Qiao et al. | 709/233 |
| 2003/0076829 A1* | 4/2003 | Rabie et al. | 370/391 |
| 2004/0081092 A1* | 4/2004 | Rhee et al. | 370/230 |
| 2005/0063370 A1* | 3/2005 | Beshai et al. | 370/360 |
| 2005/0091303 A1 | 4/2005 | Suzuki | |
| 2005/0160171 A1* | 7/2005 | Rabie et al. | 709/227 |
| 2005/0163103 A1* | 7/2005 | Malomsoky et al. | 370/352 |
| 2005/0265255 A1* | 12/2005 | Kodialam et al. | 370/252 |
| 2006/0285491 A1* | 12/2006 | Miyamoto | 370/252 |

FOREIGN PATENT DOCUMENTS

| | | |
|---|---|---|
| JP | 2000-253055 | 9/2000 |
| JP | 2001-177555 | 6/2001 |
| JP | 2003-069644 | 3/2003 |
| JP | 2005-197971 | 7/2005 |
| WO | WO 89/05552 | 6/1989 |
| WO | WO 00/10296 | 2/2000 |

OTHER PUBLICATIONS

Jonathan Werrett, "Review of Anomaly-based Network Intrusion Detection", School of Computer Science & Software Engineering, May 26, 2003, pp. 1-8.

D. Awduche, et al., "Overview and Principles of Internet Traffic Engineering", Network Working Group, May 2002, pp. 71.

Masafumi Katoh, et al., "A Study of IP Traffic Engineering Mechanisms", Mar. 2002, pp. 1-13.

Akiko Okamura et al., "A QoS Control Method Cooperating with a Dynamic Load Balancing Mechanism" APNOMS2003, Fujitsu Laboratories Ltd., Sep. 2003, pp. 1-12.

Hitoshi Yamada et al., "IP Network Control Architecture for Providing On-Demand QoS Guarantee Service", WTC2004, Sep. 11-16, 2004, pp. 1-6.

Toshio Soumiya et al., Robust and Efficient Control Method for Multilayered GMPLS Networks, WTC2004, Sep. 11-16, 2004, pp. 1-6.

Ching-Fong Su et al., Multi-Layer Traffic Engineering for OPEX Reduction in IP over WDM Networks, WTC2004, Sep. 11-16, 2004, pp. 1-6.

Masafumi Katoh, "Strategy on Ubiquitous Network Use of Knowledge by Network Middleware", Jun. 24, 2004, pp. 1-20.

Fei Xue et al., Traffic Modeling Based on FARIMA Models, CCECE99 Proceeding, May 1999, pp. 1-6.

Y. Baryshnikovl E. Coffman, et al. "Traffic Prediction on the Internet", Technical Report EE200514-1, Computer Networking Research Center, Columbia University, May 2002, pp. 1-7.

Akira Chugo et al., Next generation IP network control based on traffic engineering, Apr. 8, 2004, pp. 1-28.

* cited by examiner

| SOURCE AND DESTINATION NODES | PATH | CASE WHERE TRAFFIC TRANSITION PREDICTION IS NOT CONSIDERED | CASE WHERE TRAFFIC TRANSITION PREDICTION IS CONSIDERED |
|---|---|---|---|
| X→Y | X→Y | × | ○ |
| | X→Z→Y | ○ | × |
| X→Z | X→Z | ○ | − |
| | X→Y→Z | − | ○ |
| Y→X | Y→X | ○ | ○ |
| | Y→Z→X | × | ○ |
| Y→Z | Y→Z | × | ○ |
| | Y→X→Z | ○ | × |
| Z→X | Z→X | ○ | ○ |
| | Z→Y→X | ○ | ○ |
| Z→Y | Z→Y | ○ | ○ |
| | Z→X→Y | × | ○ |

| SOURCE AND DESTINATION NODES | PATH | CASE WHERE TRAFFIC TRANSITION PREDICTION IS NOT CONSIDERED | CASE WHERE TRAFFIC TRANSITION PREDICTION IS CONSIDERED |
|---|---|---|---|
| X→Y | X→Y | × | ○ |
|  | X→Z→Y | – | × |
| X→Z | X→Z | × | – |
|  | X→Y→Z | × | × |
| Y→X | Y→X | ○ | ○ |
|  | Y→Z→X | × | ○ |
| Y→Z | Y→Z | ○ | ○ |
|  | Y→X→Z | × | ○ |
| Z→X | Z→X | × | ○ |
|  | Z→Y→X | × | × |
| Z→Y | Z→Y | × | – |
|  | Z→X→Y | – | × |

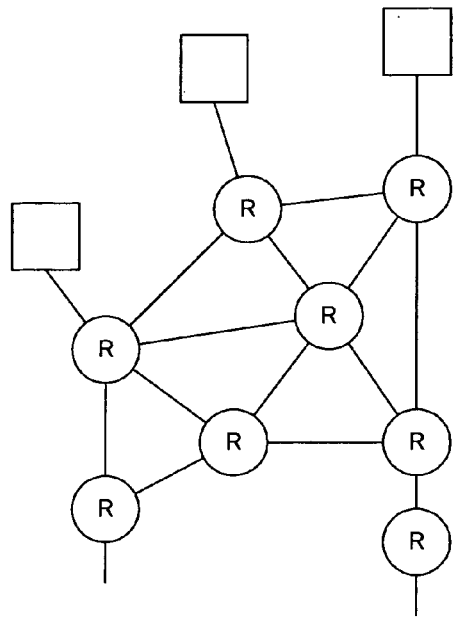
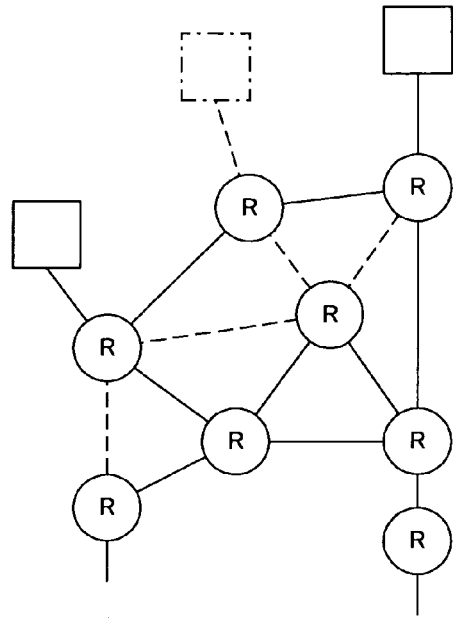
FIG.18A  FIG.18B
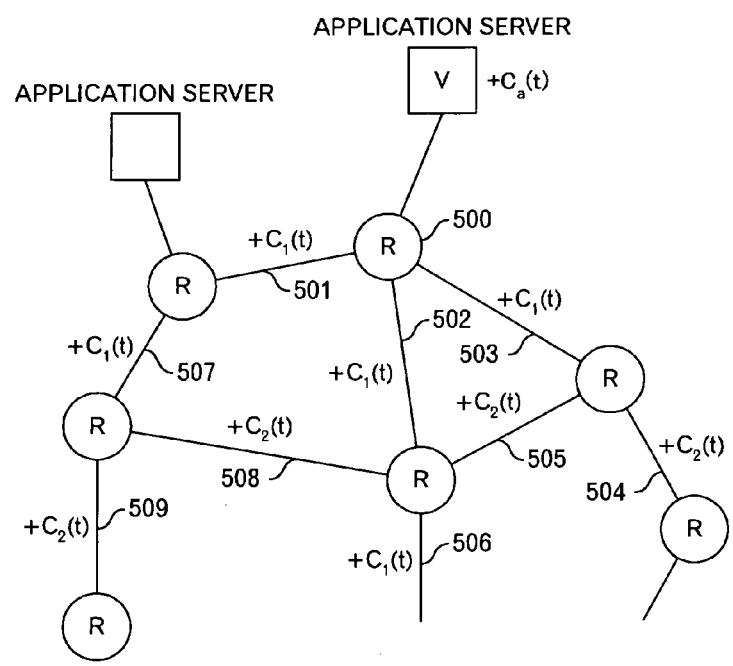
FIG.19

|  | CENTRALIZED MODEL | LAYER MODEL ||
|  |  | INTER-SUBNET | INTRA-SUBNET |
| --- | --- | --- | --- |
| ARRIVAL RATE | $\lambda_C$ | $M\lambda_C/N$ | $\lambda_C/M$ |
| CALCULATION AMOUNT : O(n) | $N$ | $M$ | $N/M$ |
| CALCULATION POWER (ASSUMPTION) | $P$ | $rP$ | $(1-r)P/M$ |
| AVERAGE SERVICE TIME | $h_C = N/P$ | $h_C' = h_C M/Nr$ | $h_C'' = h_C/(1-r)$ |
| SERVER USAGE RATE | $A_C = \lambda_C N/P$ | $A_C' = A_C M^2/rN^2$ | $A_C'' = A_C/(1-r)M$ |

| | CENTRALIZED MODEL | LAYER MODEL | |
|---|---|---|---|
| | | INTER-SUBNET | INTRA-SUBNET |
| ARRIVAL RATE | $\lambda_R$ | $\lambda_R$ | $\lambda_R/m$ |
| CALCULATION AMOUNT : O(nlogn) | $N\log N$ | $M\log M$ | $(N/M)\log(N/M)$ |
| CALCULATION POWER (ASSUMPTION) | $P$ | $rP$ | $(1-r)P/M$ |
| AVERAGE SERVICE TIME | $h_R = N\log N/P$ | $h_R{}' = h_R M\log M/rN\log N$ | $h_R{}'' = h_R \log(N/M)/(1-r)\log N$ |
| SERVER USAGE RATE | $A_R = \lambda h$ | $A_R{}' = A_R M\log M/rN\log N$ | $A_R{}'' = A_R \log(N/M)/(1-r)m\log N$ |

FIG.29

ROUTING CONTROL METHOD, APPARATUS AND SYSTEM

TECHNICAL FIELD OF THE INVENTION

The present invention relates to a prediction technique of resource utilization transition in a network, and a routing technique using a predicted result of the resource utilization transition.

BACKGROUND OF THE INVENTION

In today's situation where various crimes using a network such as a DDoS attack, hacking, and the like are increasing and the problem is becoming increasingly serious, there is a growing need for information security. Focusing on that traffic characteristics change during a DDoS attack, hacking, or the like, many researches are being conducted on methods of detecting abnormalities by observing network traffic. For example, refer to "Technical Research on High-traffic Observation and Analysis Method (Information Security Guard R&D Evaluation Services)" in 15 Jokei No. 1632, April/2004, Information-technology Promotion Agency (IPA).

More specifically, according to the result of analyzing 12 representative attack cases, it is found that a delay in the DNS request increases by 230% and a delay in the web access also increases by 30% in the presence of malicious traffic. For example, refer to Kun-chan Lan, Alefiya Hussain and Debojyoti Dutta, "The effect of malicious traffic on the network" in proceeding of PAM, Apr. 6-8, 2003, La Jolla.

In addition, as a network-based anomaly detection, "Review of Anomaly-based Network Intrusion Detection, Jonathan Werrett, 2003/05/26" discloses an approach as described below. Specifically, as a probability-based approach, the probability of a possible value in a packet field is estimated and a packet including a field having a value of the low probability or a new value is tagged as "anomalous" and thereby detected as an unauthorized access. Moreover, as a multivariate approach, a lot of variables such as the number of packets, the number of sessions per unit time, and the like are used as inputs and the probabilities of the variables are estimated to detect the unauthorized accesses. Furthermore, as a state-based approach, sessions are reconstructed and state transitions of protocols, Internet Protocol (IP), and sessions are detected as probabilities to detect the unauthorized accesses. A normal session begins with SYN and ends with FIN. Therefore, a case including any different condition is tagged as "anomalous."

Furthermore, for the network administrative department in a communications carrier or an Internet Service Provider (ISP), it is an indispensable element of nonstop operation to detect a network failure at an early stage. Thus, a study is being conducted on a mechanism for deducing the cause of the network failure from a phenomenon specific to the cause of the failure.

In addition, as for the traffic engineering (TE), it has conventionally been studied to select an optimal path according to the current situation related to the load on a network or a server. The current situation related to the load on a network or a server is one of network contexts.

A certain concept of TE is based on maximizing the network performance by utilizing a planar expanse of a network in order to select a path. As for information on this concept, refer to, for example, D. Awduche, et al., "Overview and principles of Internet traffic engineering," RFC3272, IETF, May 2002, M. Katoh, T. Soumiya, K. Nakamichi, K. Takashima, H. Yamada and A. Chugo, "A study of IP traffic engineering mechanisms," ITG2002, Duisburg, Germany, March 2002, A. Okamura, K. Nakamichi, H. Yamada and A. Chugo. "A QoS Control Method Cooperating with a Dynamic Balancing Mechanism," APNOMS2003, Japan, September 2003, Hitoshi Yamada, Akiko Okamura, Akira Chugo and Masafumi Katoh, "IP Network Control Architecture for Providing On-Demand QoS Guarantee Service," WTC2004 (Sep. 11-16, 2004), and so forth.

Specifically, even if congestion or a failure occurs in a certain place on the network, the network service performance is maintained by dynamically bypassing the traffic toward another place. Moreover, when selecting a path or a server to ensure network resources for QoS guarantee, the resources to be ensured are equally dispersed. This enables an increase in the number of acceptable requests and maximizing the network performance. It means an increase in the probability of request acceptance without a call loss for a user and an increase in the service charge income for a network service provider. Moreover, because it is a basic principle of the two-dimensional TE to use the network completely, it can be said to be a technique to avoid a useless investment such as installing new equipments to cope with an instantaneous lack of resources.

The concept of the two-dimensional TE utilizing the planar expanse of the network can be expanded into the three-dimensional TE utilizing a spatial expanse of the network. Generalized Multi-protocol Label Switching (GMPLS) aims to integrally control and manage various layer paths including an optical wavelength path, a time division multiplexing (TDM) path, and a multi-protocol label switching (MPLS) path. Therefore, when the traffic volume in an MPLS network increases in the long term and the capacity of the entire network is insufficient, the two-dimensional TE reaches critical limit. When another optical wavelength plane is used anew on such an occasion as this, it becomes possible to absorb the traffic volume expected to overflow, thereby further improving the robustness and availability of the network by means of optimal path finding and traffic dispersion with consideration given to a plurality of wavelength planes. As for these techniques, refer to Toshio Soumiya, Shinya Kano, Akira Chugo and Masafumi katoh, "Robust and Efficient Control Method for Multilayered GMPLS Networks," WTC2004 (Sep. 11-16, 2004), Chung-Fong Su and Hung-Ying Tyan, "Multi-layer Traffic Engineering for OPEX Reduction in IP over WDM Networks," WTC2004 (Sep. 11-16, 2004), and so forth.

Moreover, recently, public attention is focused on a Contextware service control for dynamically changing a method of providing a service according to the user's situation. For example, refer to Masafumi Katoh, "Ubiquitous Network Strategy—Utilization of Knowledge using Network and Middleware—", [online], Jun. 24, 2004, Ubiquitous Networking Forum, Ubiquitous Strategy Symposium, Internet <URL:http://www.ubiquitous-forum.jp/documents/sympo20040624/index.html>, and so forth.

Moreover, there has already been suggested that technical know-how and knowledge (i.e. network context) obtained through network operations are utilized by reflecting them on the network controls. As for the detailed information, refer to Kazuo Imai, "Fourth Generation Mobile Network and Expansion to Ubiquitous Network," [online], Jul. 20, 2004, The Institute of Electronics, Information and Communication Engineers (IEICE) Technical Committee on Ubiquitous and Real-World Oriented Networking (URON), Internet <URL: http://www.ieice.org/cs/uron/workshop2004.html> and so forth.

Moreover, there has been suggested a network control method including deducing a user's intention from the user's situation, setting requirements to the network while referring to a user profile, and searching for an optimal path by using a network context while referring to the policy of a service provider and the policy of a network operator.

Moreover, JP-A-2000-253055 discloses a path control method having a low incidence of call loss and a low load on a network. Specifically, it includes carrying out a routing by a routing table search when a resource reservation request occurs and causing an application to generate information concerning a call duration, storing the information into the resource reservation request packet and causing respective nodes to transfer the packet, predicting changes in the bandwidth capacity on the network from the information concerning the call duration in the respective nodes, and reflecting the information on the routing at the time of the resource reservation. However, the technique of this publication causes the application itself using the network to inform the call duration and predicts changes in the bandwidth capacity on the network, which includes the call, on the basis of the information. Therefore, consideration can be made for only bandwidth changes within holding time from the actual occurrence of the call to a time when the call will disappear, however, this technique is not intended to predict a future traffic transition before the occurrence of the call. Granted that the network resources are optimized on the basis of this prediction, only the short-time transition is considered. Therefore, this technique has a limit on improving resource efficiencies by optimization. Moreover, the publication does not mention any method of using the prediction for optimizing the network resources.

Originally, much knowledge exists on networks. For example, a study is being conducted of finding out information leakage by viewing information concerning an upper layer such as an e-mail title or the content of the e-mail. In the present application, however, it is assumed to use knowledge obtained from "an amount of layer 3 packets" and "traffic volume" that can be generally known on networks originally.

Conventionally, empirical knowledge obtained through network operations has been commonly used. For example, the timing for expansion of equipments and facilities is judged from a long-term trend of increased demands. Furthermore, when an occurrence of planning-type congestion caused by an event is anticipated, a cache function is provided near users to reduce the load on the traffic of the core network. Furthermore, at the time of earthquake or other abnormal conditions, blocking of calls is often used. In this manner, various countermeasures are taken through knowledge of experts as human beings. There has not been, however, carried out any routing using knowledge quantitatively and dynamically.

While various researches have been conducted to detect a mixture of trouble or malicious traffic by observing traffic as described above, they are based on the premise of offline analysis and thus are only assumed to be used as a tool only for obtaining a formal knowledge.

Furthermore, like an intrusion detection system (IDS) or an intrusion prevention/protection system (IPS), there are being developed techniques of detecting an unauthorized intrusion from an accidental increase of traffic or from a difference in pattern from the past. Furthermore, there is an example of the reactive control to block the intrusion when it is determined unauthorized. It is, however, limited to controls that are reactive and for use in protecting endpoints. More specifically, it is not adapted to control the entire network in a preventive manner so as to satisfy a certain service criterion by using knowledge accumulated in the network.

Furthermore, while the traffic engineering aims at the efficient use of network resources, the optimum resource allocation is conducted based on the current traffic. More specifically, the knowledge obtained through the past operations is not used and therefore only an instantaneous optimum solution is obtained.

Still further, while the document discussing the context-ware service control describes a concept using a network context or a brief information flow, it does not describe how the network context should be collected and be used as a practical matter.

SUMMARY OF THE INVENTION

Therefore, an object of the present invention is to provide a new technique for predicting utilization transition of network resources, which is included in the network context.

Another object of the present invention is to provide a technique for enabling appropriate routing based on the predicted utilization transition of the network resources.

Still another object of the present invention is to provide a technique for maximizing the resource utilization efficiency over the long term as well as at the time of the resource allocation request by carrying out the resource allocation taking into account the predicted utilization transition of the network resources.

Yet another object of the present invention is to provide a technique for systematizing and automating network operations by converting the empirical tacit knowledge of experts into explicit knowledge as network contexts.

Further object of the present invention is to provide a technique on network operation for reacting promptly with a traffic change or an abnormal condition, and for reducing network operation cost by systematizing the manual network operations to reduce the cost.

A routing control method according to a first aspect of the present invention comprises: reading out predicted utilization transition data (traffic volume, utilization rate, used bandwidth, available bandwidth, and the like) associated with a received connection set-up request from a predicted utilization transition data storage storing the predicted utilization transition data in future for each resource (for example, links between routers, servers, and the like) in a network; and selecting a resource satisfying a predetermined condition based on the read predicted utilization transition data.

By using the predicted utilization transition data as described above, an appropriate resource is identified, for example, according to the change of the resource utilization rate in future, thereby enabling more appropriate routing. For example, when there is a link in which the traffic volume increases after a predetermined period of time, it is possible to determine not to utilize such a link even if much available bandwidth is currently available.

Basically, when the arrival of large traffic such as a large bandwidth or long holding time can be predicted, a minimum cost path is allocated to the large traffic. This improves the efficiency of the resource utilization. More specifically, it is assumed that there is a network in which N nodes are connected via a bidirectional ring as shown in FIG. 26, for example. The path connecting adjacent nodes includes a shortest path of one hop and an alternative path of N−1 hops. It is assumed here that, as shown in FIG. 27, a path setting request of a path #a carrying small traffic (bandwidth Ba, holding time ha) arrives and, immediately thereafter, a path setting request of a path #b carrying large traffic (bandwidth Bb, holding time hb) arrives. If the arrival of the path #b is not predicted, the shortest path is allocated to the path #a and an alternative path is allocated to the path #b, because the path #b is requested while the shortest path is occupied by the path #a. The resource consumption (the total sum of the used bandwidths for the used links) is represented by Baha+(N−1)*Bbhb. If the arrival of the path #b carrying the large traffic can be predicted, the alternative path is allocated to the path #a requested earlier in order to allocate the shortest path to the path #b. And then, at the time of receiving the request for the path #b, the shortest path can be allocated to the path #b. The resource consumption (the total sum of the used bandwidths for the used links) is represented by Bbhb+(N−1)*Baha. When the traffic volume of the path #b is remarkably larger than the traffic volume of the path #a, for example, when the path #a is for use in a phone call with the holding time ha of two minutes and the path #b is for use in video distribution with the holding time hb of two hours, the former allocation is overwhelmingly less efficient because the alternative path is occupied for the long holding time. Assuming Bbhb>>Baha is satisfied here in an extreme case, and Baha can be negligible, the resource consumption is (N−1)*Bahb unless the arrival of the large traffic is predicted. If it is predicted, the resource consumption is Bbhb when the shortest path is allocated to the large traffic. Therefore, the resource consumption when predicting the arrival of the large traffic becomes 1/(N−1) comparing with the case where the arrival of the large traffic is not predicted. As described above, it becomes possible to optimize the utilization efficiency of the resources, not instantaneously, but for the long term, by predicting the future traffic transition.

A routing control method according to a second aspect of the present invention, comprises: receiving a connection set-up request; and selecting a resource selection processing for the connection set-up request among a first processing, a second processing and a third processing. The first processing comprises: reading out predicted utilization transition data associated with the received connection set-up request from a predicted utilization transition data storage storing the predicted utilization transition data in future for each resource in a network, and selecting a resource satisfying a first predetermined condition based on the read predicted utilization transition data. The second processing comprises: selecting a resource satisfying a second predetermined condition by using data concerning a static attribute for each resource of the network, the data concerning the static attribute stored in a network data storage. The third processing comprises: selecting a resource satisfying a third predetermined condition by using current utilization status data for each resource of the network, the current utilization status data stored in a network context data storage. Thus, by switching the resource selection processing according to needs, the resource can be appropriately selected depending on the situation.

Furthermore, the selecting the resource selection processing may be executed when generating a conditional network topology graph corresponding to the connection set-up request or when searching for a minimum cost path corresponding to the connection set-up request from a network topology graph.

In addition, as described above, in order to reserve the shortest path for the connection set-up request for the large traffic, which is to arrive in the future, the shortest path may be prohibited from being selected for other connection set-up requests that occur before the connection set-up request for the large traffic. To that end, it is good that a path is selected for other connection set-up requests on the basis of link costs on the premise of the future arrival of the large traffic.

In general, the routing control method according to the first aspect of the present invention may further include: detecting the arrival of the connection set-up request for the large amount of traffic whose bandwidth or holding time is greater than a predetermined value on the basis of the predicted utilization transition data. And, the aforementioned selecting may include: obtaining a cost of each resource for a communication request for traffic other than the high volumes of traffic based on the predicted utilization transition data relating to the arrival of the communication request for the large amount of traffic to select a resource whose cost satisfies a second predetermined condition; and obtaining a cost of each resource for the communication request for the large amount of traffic by using current utilization status data for each resource of the network, which is stored in a network context data storage, or by using static attribute information stored in a network data storage to select a resource whose cost satisfies a third predetermined condition. This enables a minimum cost path to be allocated to the connection set-up request for the large amount of traffic.

Furthermore, the aforementioned selecting may include: identifying a value representing the strictest predicted utilization status in a period associated with the connection set-up request, in the read predicted utilization transition data. In other words, it is intended to consider a bottleneck, not instantaneously, but within a certain period.

Incidentally, the routing control method according to the first aspect of the present invention may further include: generating first predicted utilization transition data for each resource of the network by multiplying or adding long-term change pattern data by or to periodic change pattern data of a utilization status or non-periodic event change pattern data of the utilization status, which are generated in advance for each resource of the network and stored in a change pattern data storage. The first predicted utilization transition data may be used as the predicted utilization transition data.

Furthermore, the routing control method according to the first aspect of the present invention may further include: generating second predicted utilization transition data by modifying the generated first predicted utilization transition data so as to be identical with current utilization status data for each resource of the network, which is stored in a network context data storage. The second predicted utilization transition data may be used as the predicted utilization transition data.

Furthermore, the routing control method according to the first aspect of the invention may further include: generating third predicted utilization transition data by modifying the generated second predicted utilization transition data in accordance with a physical upper limit value of each resource of the network. The third predicted utilization transition data may be used as the predicted utilization transition data.

It is possible to create a program for causing a computer to execute the aforementioned method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

The aforementioned and other objects, features and advantages of the present invention will become apparent from the following detailed description when taken with the accompanying drawing in which:

FIG. 18A is a diagram showing an original network topology graph;

FIG. 18B is a diagram showing a network topology graph after pruning;

FIG. 19 is a diagram to explain a method of spreading an increment of the server traffic over links;

FIG. 29 is a diagram showing another example of the performance evaluation model in the hierarchical network control mechanism;

DETAILED DESCRIPTION OF THE PREFERRED EMBODIMENTS

A. System Outline

Figure 1:
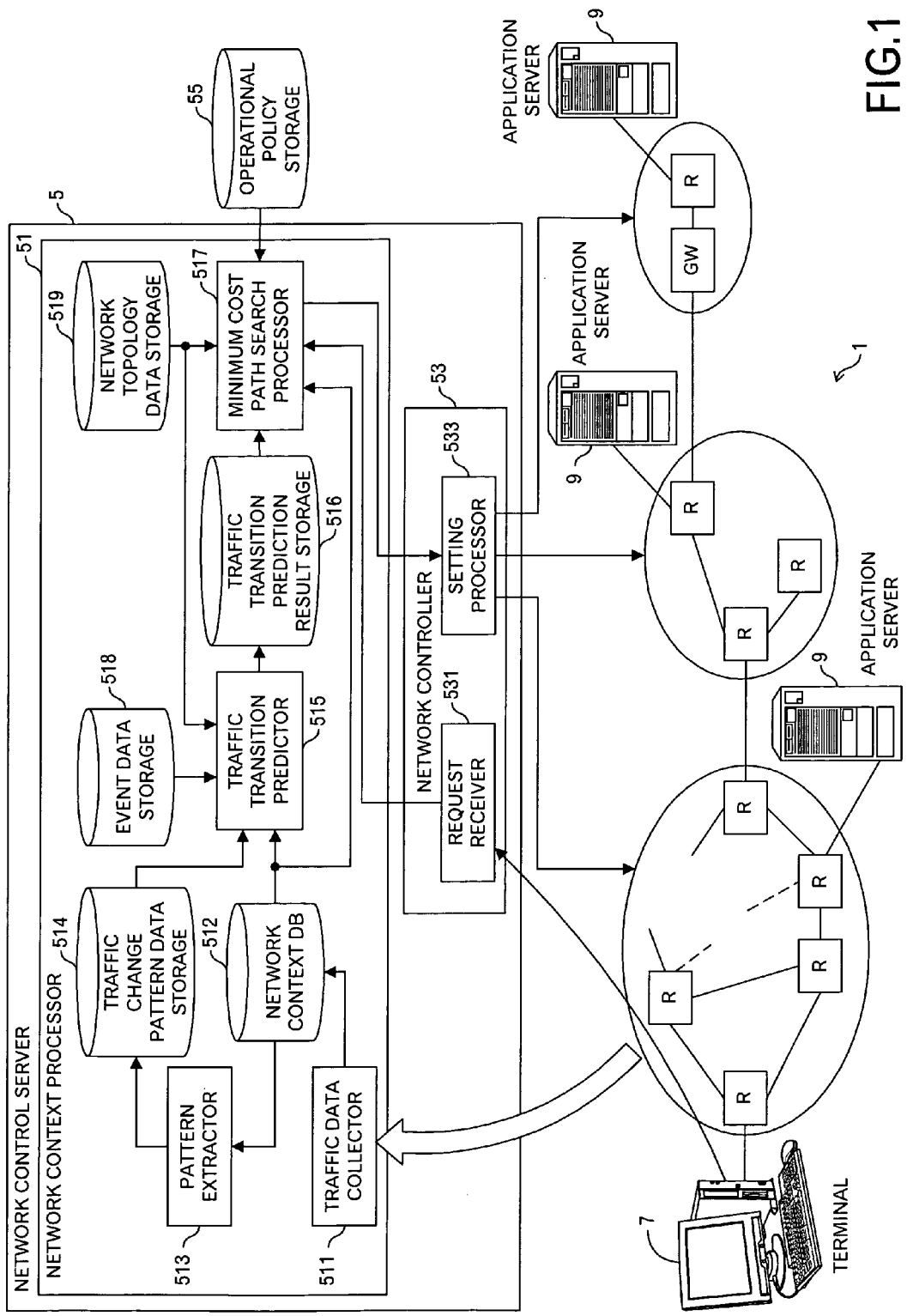
FIG. 1 is a diagram for explaining the outline of a system according to an embodiment of the present invention.

The outline of a system according to an embodiment of the present invention will now be described below with reference to FIG. 1. A network 1, which is an observation target and also a control target, is connected to a lot of routers R, gateways GW, and the like. Moreover, the router R is connected to terminals 7, application servers 9, and the like. Furthermore, the network 1 is connected to a network control server 5. The network control server 5 includes a network context processor 51 for carrying out a processing associated with a network context, a network controller 53 for carrying out settings for the routers R and the like in response to a connection set-up request from the terminal 7, and an operational policy storage 55 that stores an operational policy set by a network administrator or the like.

The network context processor 51 includes a traffic data collector 511 for collecting traffic data, which is a network context, from the network 1; a network context database (DB) 512 for storing the traffic data collected by the traffic data collector 511; a pattern extractor 513 for extracting pattern data to be used in predicting the traffic transition by supporting an administrator of the network context processor 51; a traffic change pattern data storage 514 for storing the traffic change pattern data extracted by the pattern extractor 513 and the like; an event data storage 518 for storing data such as the schedule of events, which fluctuate traffic in the network 1; a network topology data storage 519 for storing data (a link connection configuration, a server performance, a link physical capacity, a default cost, and the like) about the topology graph of the network 1; a traffic transition predictor 515 for predicting the traffic transition by using data stored in the traffic change pattern data storage 514, the network context DB 512, the event data storage 518, and the network topology data storage 519; a traffic transition prediction result storage 516 for storing a traffic transition prediction result as a processing result of the traffic transition predictor 515; and a minimum cost path search processor 517 for carrying out a minimum cost path search processing by using data stored in the traffic transition prediction result storage 516, the operational policy storage 55, the network topology data storage 519, and the network context DB 512, in response to a request from the network controller 53, and outputting path data and the like to the network controller 53.

The network controller 53 includes a request receiver 531 for receiving a connection set-up request or the like, which has been sent from the terminal 7, through the router R and outputting a path search request to the minimum cost path search processor 517 in the network context processor 51 and a setting processor 533 for carrying out settings necessary for a QoS control or a resource allocation for the routers R and the like on the basis of the path data received from the minimum cost path search processor 517.

The details of the processings of the network control server 5 will be described later.

B. Transition Prediction of Network Traffic

As described above, the traffic data collector 511 collects traffic data such as the received or transmitted or received and transmitted data amount or the number of received or transmitted or received and transmitted packets, from the routers R and the servers as needed and then stores the traffic data into the network context DB 512. The pattern extractor 513 extracts a long-term trend or daily, weekly, monthly, annually and other periodic change patterns on the basis of the traffic data stored in the network context DB 512 and accepts inputs related to events fluctuating the network traffic from the administrator of the network control server 5 to identify change patterns of various events. The administrator of the network control server 5 may directly input data of the change patterns of the network traffic in some cases. The traffic change pattern data storage 514 stores data of time-series traffic volumes such as a change pattern indicating a long-term trend, a periodic change pattern, change patterns of various events, and the like.

Figure 2A:
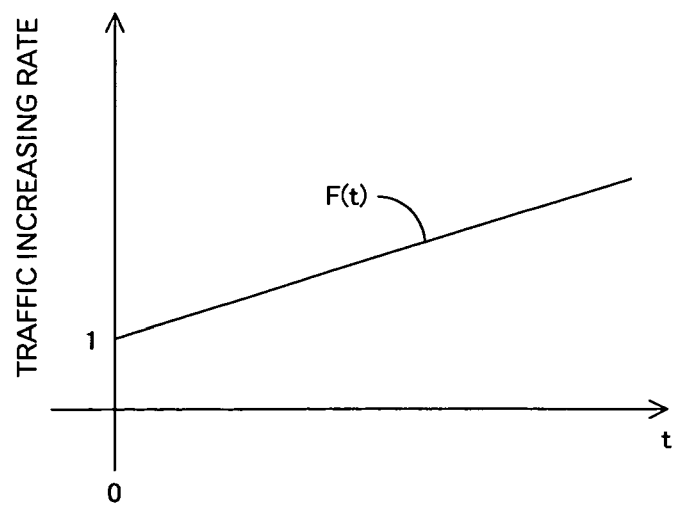
FIG. 2A is a diagram showing an example of a long-term change pattern.
Figure 2B:
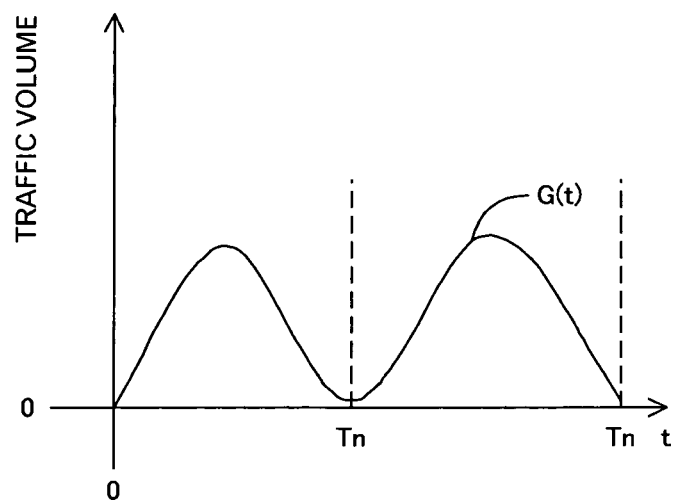
FIG. 2B is a diagram showing an example of a periodic change pattern.
Figure 2C:
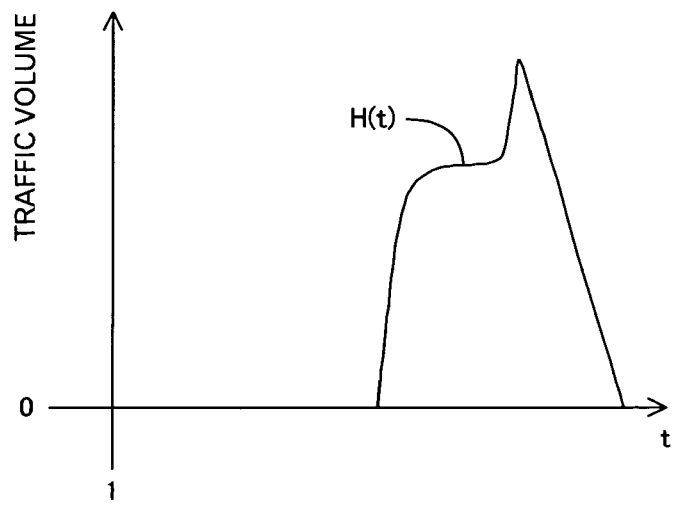
FIG. 2C is a diagram showing an example of an event change pattern.

FIGS. 2A to 2C show examples of change patterns. For example, the change pattern indicating the long-term trend is represented by a straight line F(t), for example, as shown in FIG. 2A or a curve. In FIG. 2A, the axis of ordinate represents a traffic increasing rate (or increment in some cases), while the axis of abscissa represents time, where F(t)=kt+1 (k is a constant).

As for an applicable mode of the change pattern representing a long-term trend, there are two types: a multiplication type represented by aF(t)X and an addition type represented by X+bF(t), for the traffic volume X obtained from past elements other than the change pattern indicating the long-term trend. The multiplication type is based on the concept that, if the entire traffic volume is F(t) times larger than before, the traffic volume X generated from a certain past event is also F(t) times larger than before. Incidentally, "a" indicates an adjustment factor of F(t): 1 or a greater value is used if the traffic volume should be increased to F(t) or greater and a value less than 1 is used if the traffic volume should be limited to a lower value than F(t). The addition type is based on the concept that the traffic volume itself generated from a certain past event does not change so much even if the entire traffic volume increases. In this embodiment, it is assumed that the traffic volume of events other than the aforementioned event, which is indicated by the factor b is multiplied by F(t) and added to X.

In addition, a periodic change pattern is, as shown in FIG. 2B, represented by a curve G(t)=Gn(t+mTn)=Gn(t) (m is an integer) in which the same waveform is repeated every period Tn. The period Tn is daily (24 hours) (T1), weekly (T2), monthly (T3), annually (T4) or the like as described above. In FIG. 2B, the axis of ordinate represents a traffic volume, while the axis of abscissa represents time. Moreover, the change patterns of the various events are each represented by, for example, a curve H(t) having an arbitrary waveform as shown in FIG. 2C. Incidentally, in FIG. 2C, the axis of ordinate represents the traffic volume, while the axis of abscissa represents time. The curve H(t) represents a network traffic change pattern in the cases, for example, where a popular program is released into the public domain from a certain server, where the a new ringer-melody distribution is launched, where the advance sale of popular tickets begins, or where a hit program distribution is launched. In this embodiment, the curve H(t) is handled, in which the network traffic change can be associated with its cause, and the traffic change pattern data storage 514 stores the change pattern data registered together with the event attributes.

Figure 3:
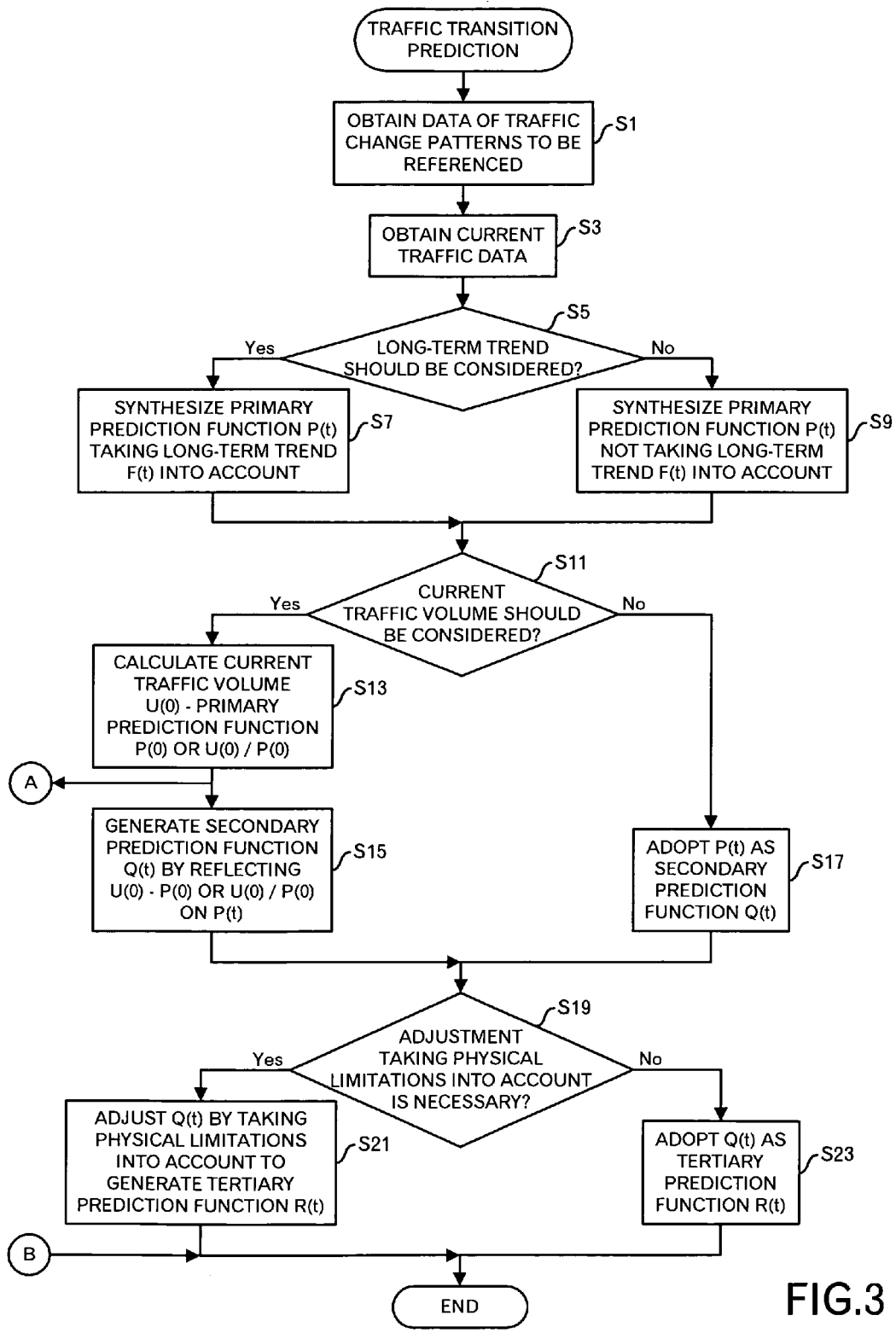
FIG. 3 is a diagram showing a processing flow of traffic transition prediction.

On such assumption, the traffic transition predictor 515 carries out a processing as described below. First, the traffic transition predictor 515 acquires data of the traffic change pattern to be referenced from the traffic change pattern data storage 514 (FIG. 3: step S1). The traffic change pattern data to be referenced includes the periodic change pattern data for the links and the like relating to the traffic transition prediction, the change pattern data representing the long-term trend for the links concerned and the like, and the change pattern data on the events (stored in the event data storage 518) existing during the transition prediction period for the links concerned and the like.

Moreover, the traffic transition predictor 515 acquires the current traffic data of links concerned and the like relating to the traffic transition prediction from the network context DB 512 (step S3).

Then, the traffic transition predictor 515 judges whether the long-term trend should be considered (step S5). For example, whether the long-term trend should be considered is determined according to whether or not the traffic transition prediction satisfies a predetermined condition, such as whether or not an original event whose change pattern on the event is acquired in the step S1 occurs before a predetermined timing. Currently, the Internet traffic increases continuously more than doubling each year. Therefore, if the event to be referenced occurred one year ago, it is inadequate to prepare resources for the next event with ignoring the increase of the Internet traffic. It is more natural to assume that the traffic volume increases twice the traffic H(t) of the previous event, and to reserve the necessary resources.

When it is determined that the long-term trend should be considered, the traffic transition predictor 515 synthesize a primary prediction function P(t) by using the long-term trend change pattern F(t) and the periodic change pattern G(t) or the event change pattern H(t) or both thereof (step S7). Incidentally, after the step S7, the processing shifts to step S11.

Figure 4A:
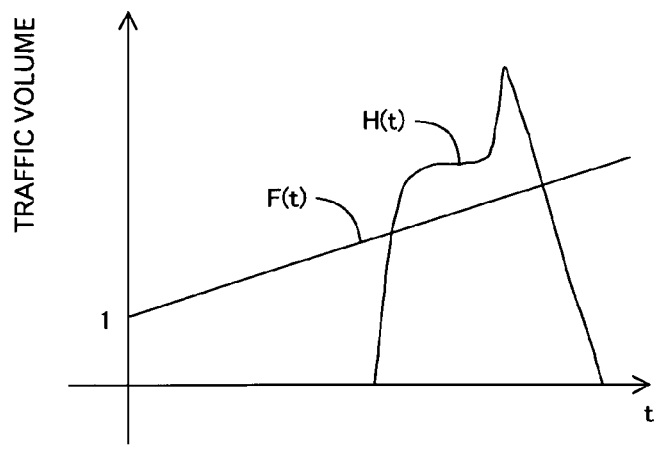
FIG. 4A is a diagram showing the long-term change pattern and the event change pattern.
Figure 4B:
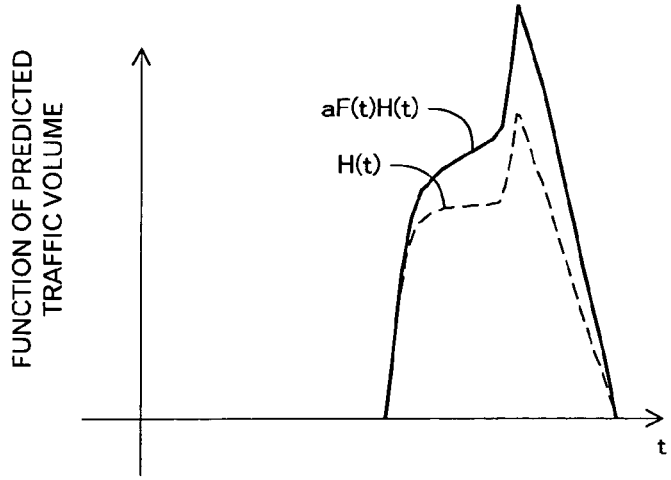
FIG. 4B is a diagram showing a multiplication-type synthesis of the patterns shown in FIG. 4A.
Figure 4C:
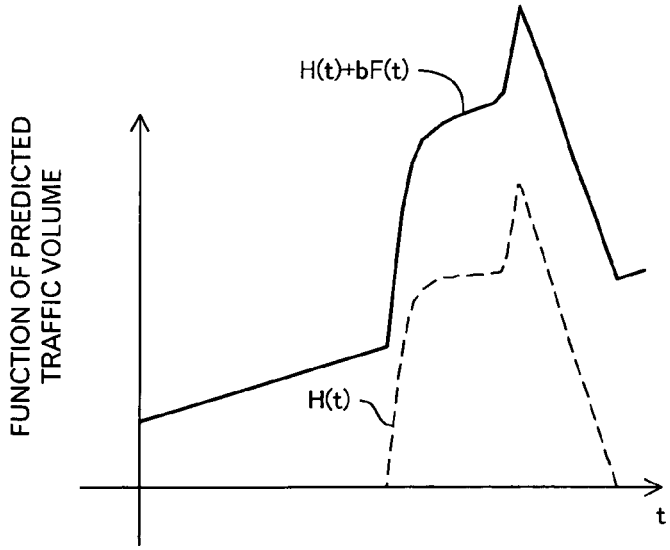
FIG. 4C is a diagram showing an addition-type synthesis of the patterns shown in FIG. 4A.

The following describes the application of the long-term trend to, for example, the event change pattern H(t) with reference to FIGS. 4A to 4C. For example, it is assumed to consider the long-term trend change pattern F(t) and the event change pattern H(t) as shown in FIG. 4A. As for the multiplication type, the primary prediction function is expressed by P(t)=aF(t)H(t), which results in the traffic transition prediction represented by the waveform (solid line) as shown in FIG. 4B. It assumes a case where the entire traffic increasing in the change pattern F(t) relates to the event. As for the addition type, the primary prediction function is expressed by P(t)=H(t)+bF(t), which results in the traffic transition prediction represented by the waveform (solid line) as shown in FIG. 4C. It assumes a case where the traffic relating to the event follows the change pattern H(t) independently of the entire traffic increasing in the change pattern F(t). In FIG. 4B and FIG. 4C, the dashed line represents the original H(t). If the traffic increase H(t) caused by an occurrence of the event is not so much affected by the long-term trend change pattern F(t), the primary prediction function may be calculated with a<1 or b<1.

Figure 5A:
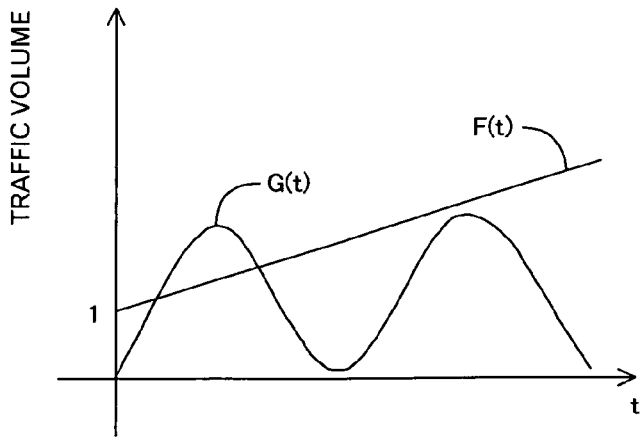
FIG. 5A is a diagram showing the long-term change pattern and the periodic change pattern.
Figure 5B:
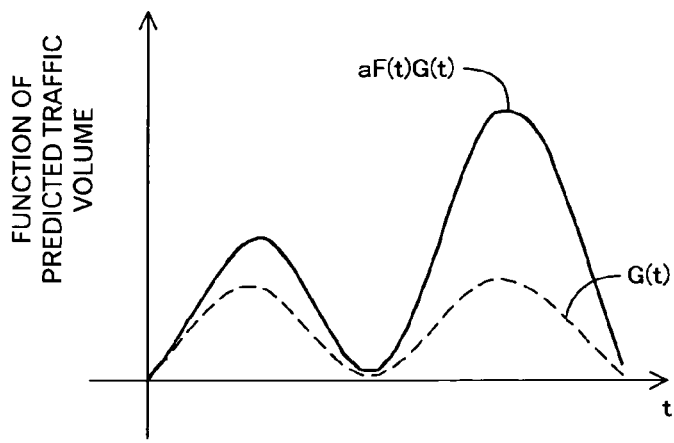
FIG. 5B is a diagram showing a multiplication-type synthesis of the patterns shown in FIG. 5A.
Figure 5C:
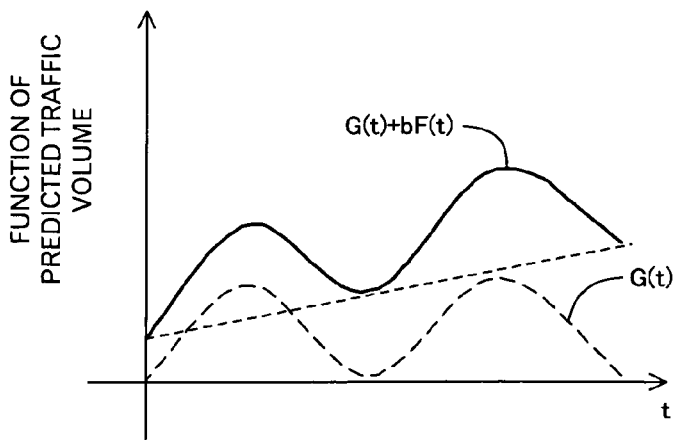
FIG. 5C is a diagram showing an addition-type synthesis of the patterns shown in FIG. 5A.

Furthermore, the following describes the application of the long-term trend to the periodic change pattern G(t) with reference to FIGS. 5A to 5C. For example, it is assumed to consider the long-term trend change pattern F(t) and the periodic change pattern G(t) as shown in FIG. 5A. As for the multiplication type, the primary prediction function is expressed by P(t)=aF(t)G(t), which results in the traffic transition prediction represented by the waveform (solid line) as shown in FIG. 5B. Incidentally, the dashed line represents G(t) in FIG. 5B. For the addition type, the primary prediction function is expressed by P(t)=G(t)+bF(t), which results in the traffic transition prediction represented by the waveform (solid line) as shown in FIG. 5C. Incidentally, the dashed line represents G(t) and the fine dashed line represents F(t) in FIG. 5C. For example, as for a daily, weekly, or other short prediction period, the setting of a=1 or b<<1 may be made, assuming that the long-term trend change pattern F(t) will not be affected.

Incidentally, although there is not shown a mode combining all of the long-term trend change pattern F(t), the periodic change pattern G(t), and the event change pattern H(t), they can be combined in the same manner as described above.

On the other hand, when it is determined that there is no need to consider the long-term trend, the traffic transition predictor 515 generates the primary prediction function P(t) by using the periodic change pattern G(t), the event change pattern H(t), or both (step S9). After the step S9, the processing shifts to step S11.

More specifically, regarding the event change pattern H(t), H(t) itself is used as the traffic transition prediction, or if H(t) is defined as a value h times the normal traffic volume x, hx is considered to be the traffic transition prediction. In addition, the periodic change pattern G(t) itself is used as the traffic transition prediction. As the case may be, they may be combined by an addition or the like of the event change pattern H(t) and the periodic change pattern G(t).

Thereafter, the traffic transition predictor 515 judges whether or not the current traffic volume should be considered (step S11). For example, when the multiplication type is adopted when generating the primary prediction function P(t), the primary prediction function P(t) changes independently of the current traffic volume and therefore in such as case, the traffic transition predictor 515 determined that the current traffic volume should not be considered.

When it is determined that the current traffic volume should be considered, the primary prediction function P(t) is corrected from the following viewpoint. Specifically, the subsequent traffic volumes are estimated by the primary prediction function P(t), while the current traffic volume U(0) does not always match the current traffic volume P(0) in the primary prediction function P(t). Therefore, a secondary prediction function Q(t) satisfying that U(0) equals to the value Q(0) of the secondary prediction function. Specifically, the traffic transition predictor 515 calculates the current traffic volume U(0) minus the value P(0) of the primary prediction function or U(0)/P(0) (step S13). Incidentally, an additional processing flow using the result of the calculation in the step S13 will be described later with reference to FIG. 8, after a terminal A.

Figure 6A:
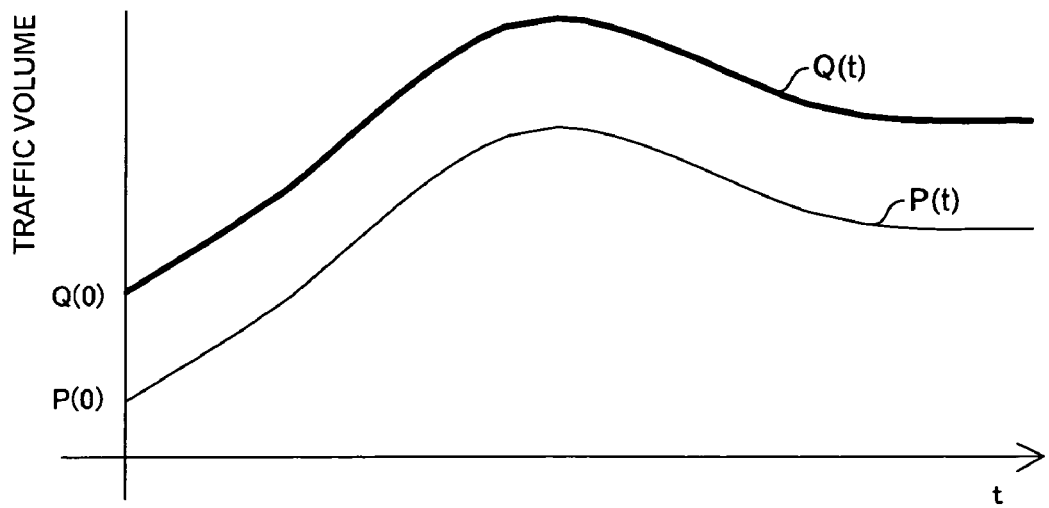
FIGS. 6A and 6B are diagrams for explaining a second prediction.
Figure 6B:
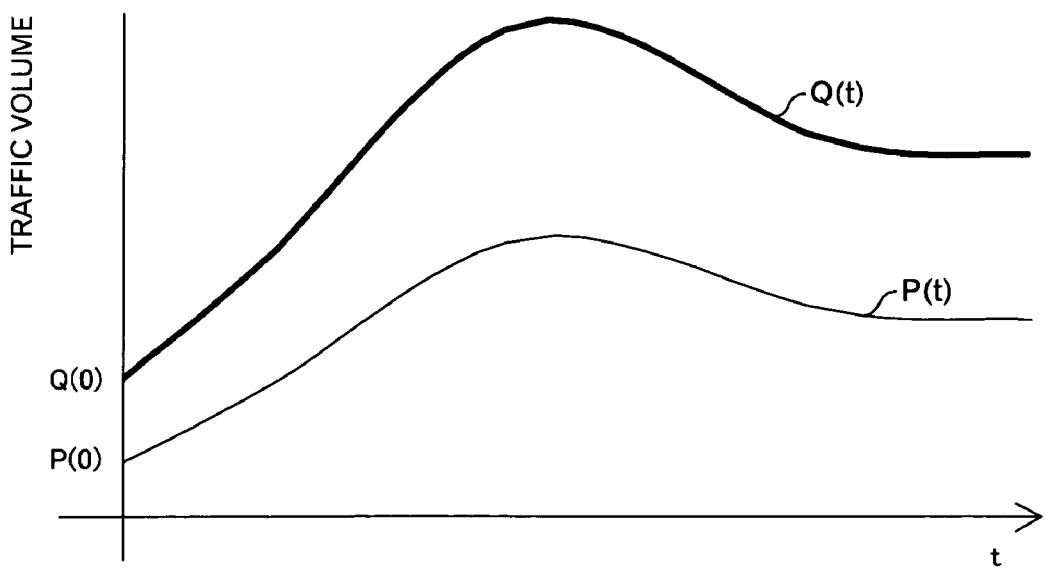

Then, the traffic transition predictor 515 reflects the relation (U(0)−P(0) or U(0)/P(0)) between the current traffic volume U(0) and the value P(0) of the primary prediction function on P(t), and generates the secondary prediction function Q(t) (step S15). As for this processing, there are two methods: a predicted-actual difference addition type reflection method, in which U(0)−P(0) is added to P(t), and a predicted-actual ratio multiplication type reflection method, in which P(t) is multiplied by U(0)/P(0). In the predicted-actual difference addition type reflection method, Q(0)=U(0) is achieved as the secondary prediction function Q(t)=P(t)+U(0)−P(0). For example, as shown in FIG. 6A, P(t) is moved in parallel upward if P(0)<U(0). In the predicted-actual ratio multiplication type reflection method, Q(0)=U(0) is achieved as the secondary prediction function Q(t)=P(t)U(0)/P(0). For example, as shown in FIG. 6B, P(t) is transformed so as to increase if P(0)<U(0). Thereafter, the processing shifts to step S19.

On the other hand, when it is not determined that the current traffic volume should be considered, P(t) itself is adopted as the secondary prediction function Q(t) (step S17). Thereafter, the processing shifts to the step S19.

Then, the traffic transition predictor 515 judges whether or not there is a need to adjust the secondary prediction function Q(t) by taking into account physical limitations (step S19). While the future traffic transition is estimated and adjusted on the basis of the past traffic change in the processing described hereinabove, it is conceivable that Q(t) will be a practically impossible value. As for the predication of the traffic demand itself, there is no impossible value. However, when the secondary prediction function Q(t) represents the transition prediction of a utilized bandwidth of a link or a utilized performance value of a server, the value of Q(t) is limited to the physical bandwidth of the link or the maximum performance value of the server.

In the step S19, it is determined whether or not the secondary prediction function Q(t) is adjusted taking into account the physical limitations, according to a setting that has been preset regarding whether or not it should be adjusted taking into account the physical limitations. In terms of results, it may have the same result. It is based on the concept that, when the traffic volume increases with an increasing rate of F(t) in the long term, nodes (for example, routers), links (i.e. transmission lines), and servers or other devices ought to be increased with a rate of F(t), too. In other words, in terms of the utilization rate, when the multiplication type is adopted taking into account the long-term trend, the physical upper limit Bu (denominator) is also increased. Therefore, even if the traffic volume (numerator) increases, the utilization rate will not be 100% or higher. In this instance, the traffic transition predictor 515 adopts the secondary prediction function Q(t) as a tertiary prediction function R(t) (step S23). Then, the data of the tertiary prediction function R(t) is stored into the traffic transition prediction result storage 516.

On the other hand, when it is determined that the secondary prediction function Q(t) should be adjusted taking into account the physical limitations, the traffic transition predictor 515 adjusts the secondary prediction function Q(t) by taking into account the physical limitations and generates the tertiary prediction function R(t) (step S21). Data of the generated tertiary prediction function R(t) is stored into the traffic transition prediction result storage 516. As for the adjustment, there are following methods: (1) a method of carrying out the adjustment by cutting off the part exceeding the upper limit Bu; (2) a method of carrying out the adjustment by shifting the excess part in time; (3) a method of carrying out the adjustment in such a way that Q(t) is wholly lower than the upper value Bu.

Figure 7A:
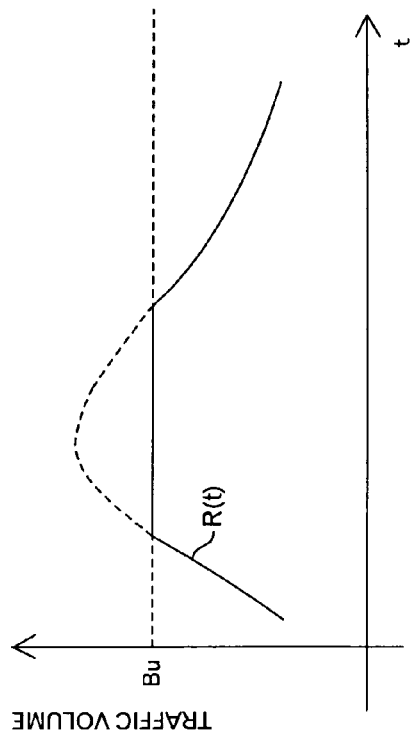
FIGS. 7A to 7D are diagrams for explaining a third prediction.
Figure 7B:
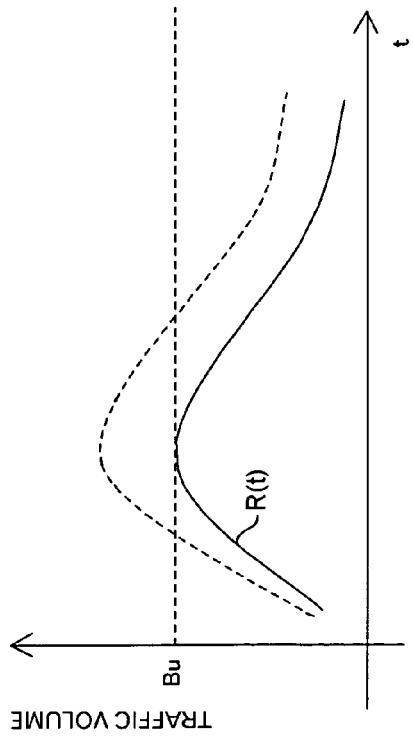

The following describes the adjustment method by using the secondary prediction function Q(t) having a part exceeding the upper limit Bu of the traffic volume, for example, as shown in FIG. 7A. When the adjustment method in (1) is applied, the calls in the part exceeding the upper limit Bu are rejected as call losses. Therefore, the part exceeding the upper limit Bu is cut off so as to be set to the same value as the upper limit Bu, and the remaining part of the secondary prediction function Q(t) itself is used as it is to generate the tertiary prediction function R(t). These are expressed by the following equations:

$$R(t)=Bu(Q(t)>Bu)$$

$$R(t)=Q(t)(Q(t)\leq Bu)$$

Figure 7C:
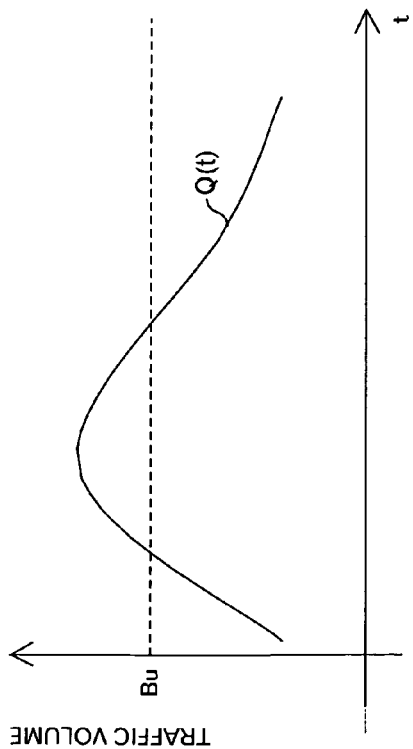
Figure 7D:
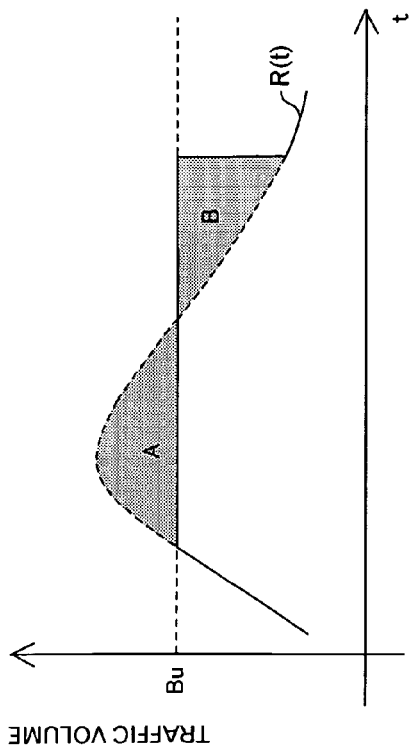

When the adjustment method in (2) is applied, the calls in the part exceeding the upper limit Bu are rejected as call losses, however, all of the calls in the part are retried and processed continuously at the upper limit Bu until all of them are accepted. As a result, the processing time at the upper limit Bu becomes long. As shown in FIG. 7C, the same traffic volume as the area A of the part exceeding the upper limit Bu is processed by using the part lower than the upper limit Bu.

The adjustment method in (3) is to carry out normalization so that the maximum value of Q(t) matches the upper limit Bu. When this method is applied, a ratio Bu/max{Q(t)} of the upper limit Bu to the maximum value of the secondary prediction function Q(t) is calculated and then the tertiary prediction function R(t) is set so as to satisfy: R(t)=Q(t)Bu/max{Q(t)}. Alternatively, Bu−max{Q(t)} may be calculated for a setting of the tertiary prediction function R(t)=Q(t)+Bu−max{Q(t)}.

By carrying out such a processing, the traffic transition can be predicted.

Incidentally, in the aforementioned processing, the simplified basic idea has been described only. To carrying out routing with the traffic transition prediction, which will be described below, a traffic estimated amount or the like is associated with a target edge routers or servers every period of time for each link or the like.

Figure 8:
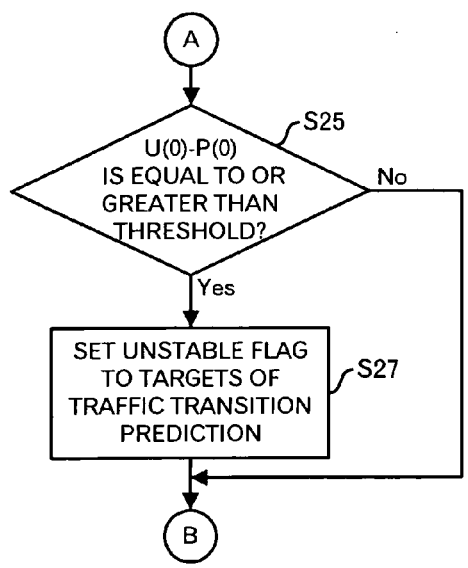
FIG. 8 is a diagram showing a processing flow of stability determination.

Here, the processing after the terminal A in FIG. 3 will be described below with reference to FIG. 8. First, the traffic transition predictor 515 judges whether or not U(0)−P(0) or U(0)/P(0) is more than or equal to a predetermined threshold (step S25). When it is less than the threshold, the processing is terminated via a terminal B without any particular processing. When it is less than the threshold, the actual traffic follows the traffic transition prediction, in other words, the state is stable, and therefore a flag indicating "stable" is set in the traffic transition prediction result storage 516, if necessary. On the other hand, when it is more than or equal to the threshold, the actual traffic does not follow the traffic transition prediction, in other words, the actual traffic includes a Denial of Service (DoS) attach, an unauthorized intrusion, or the occurrence of failures or other unpredictable conditions, and therefore it is interpreted that the traffic significantly differs from the prediction. In this instance, assuming that the target of the traffic transition prediction is unstable, the traffic transition predictor 515 sets an unstable flag to the targets of the traffic transition prediction in the traffic transition prediction result storage 516 (step S27). When a high cost is allocated to the target of the traffic transition prediction according to the unstable flag, the selection of a resource having the lowest cost means the selection of the most stable resource. Incidentally, an instability index may be set according to U(0)−P(0) or U(0)/P(0), instead of the flag.

When comparing the difference between the actual traffic and the traffic transition prediction with the threshold, there is no need to limit the number of judgments with the threshold to once. There is also a method of checking the stability on a long-term basis, instead of an instantaneous judgment. With several measurements, when the value exceeds the threshold at a certain rate or higher, the target of the prediction is determined to be unstable, and the rate exceeding the threshold may be set to the cost.

With this cost setting, when a conditional network topology graph is created by extracting links and servers whose cost is less than or equal to a certain value, only stable links and servers are obtained. In addition, by selecting a path whose sum of costs is the smallest, a user can use a path with the most stable resources for communication. This method enables the selection of stable links, servers, or paths and further aims at the following. Because the high-cost unstable links, servers, or paths are hard to be selected in this manner, those unstable links and the like will not be used for new connection set-up requests and the connection requests will be allocated to ones requiring stability. Therefore, as the connections and paths already using those resources terminate, the traffic decreases and thus the actual traffic becomes close to the traffic transition prediction. In other words, the traffic using unstable links and servers are indirectly restricted.

Figure 30:
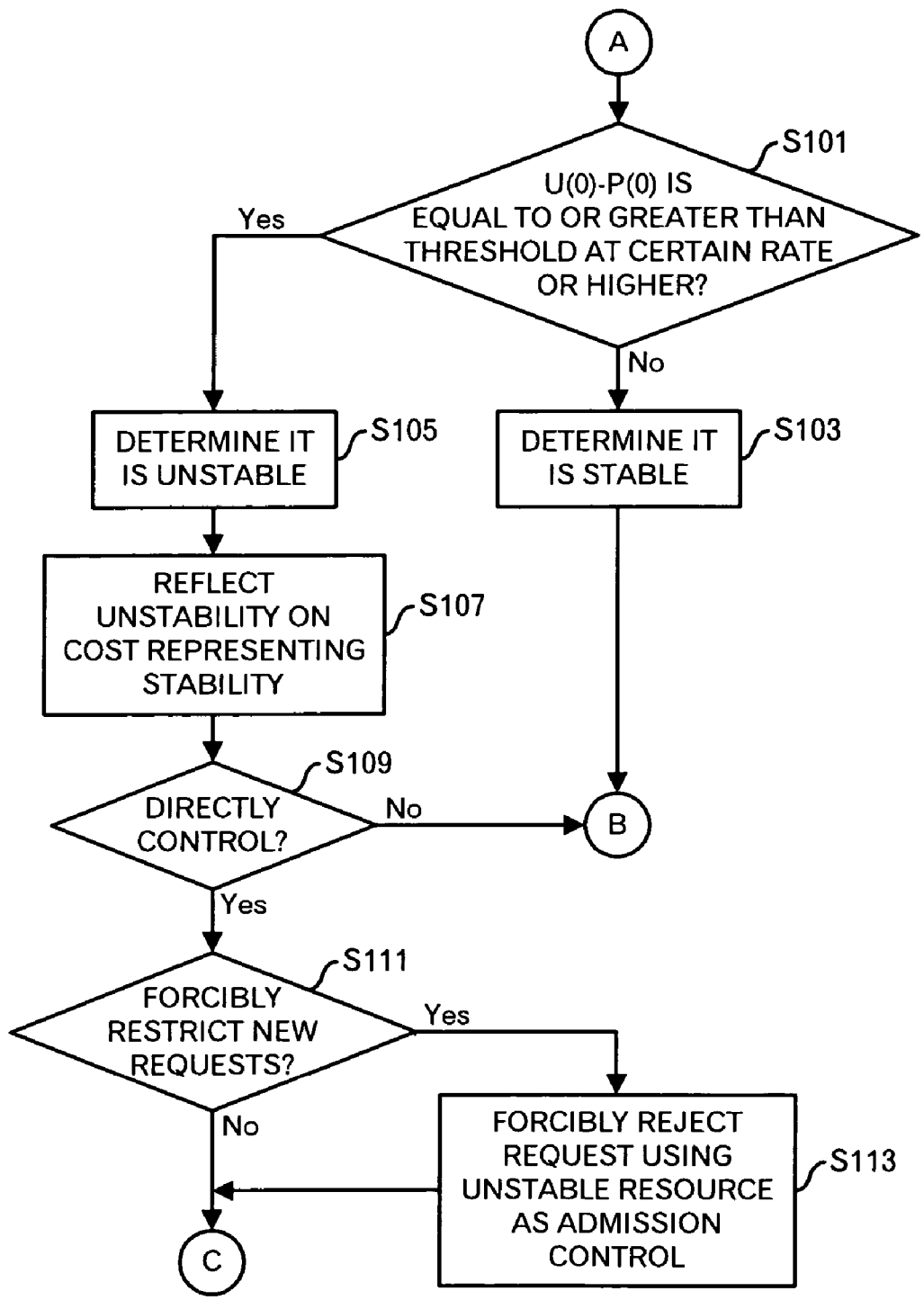
FIG. 30 is a diagram showing a processing flow (first portion) executed instead of FIG. 8.
Figure 31:
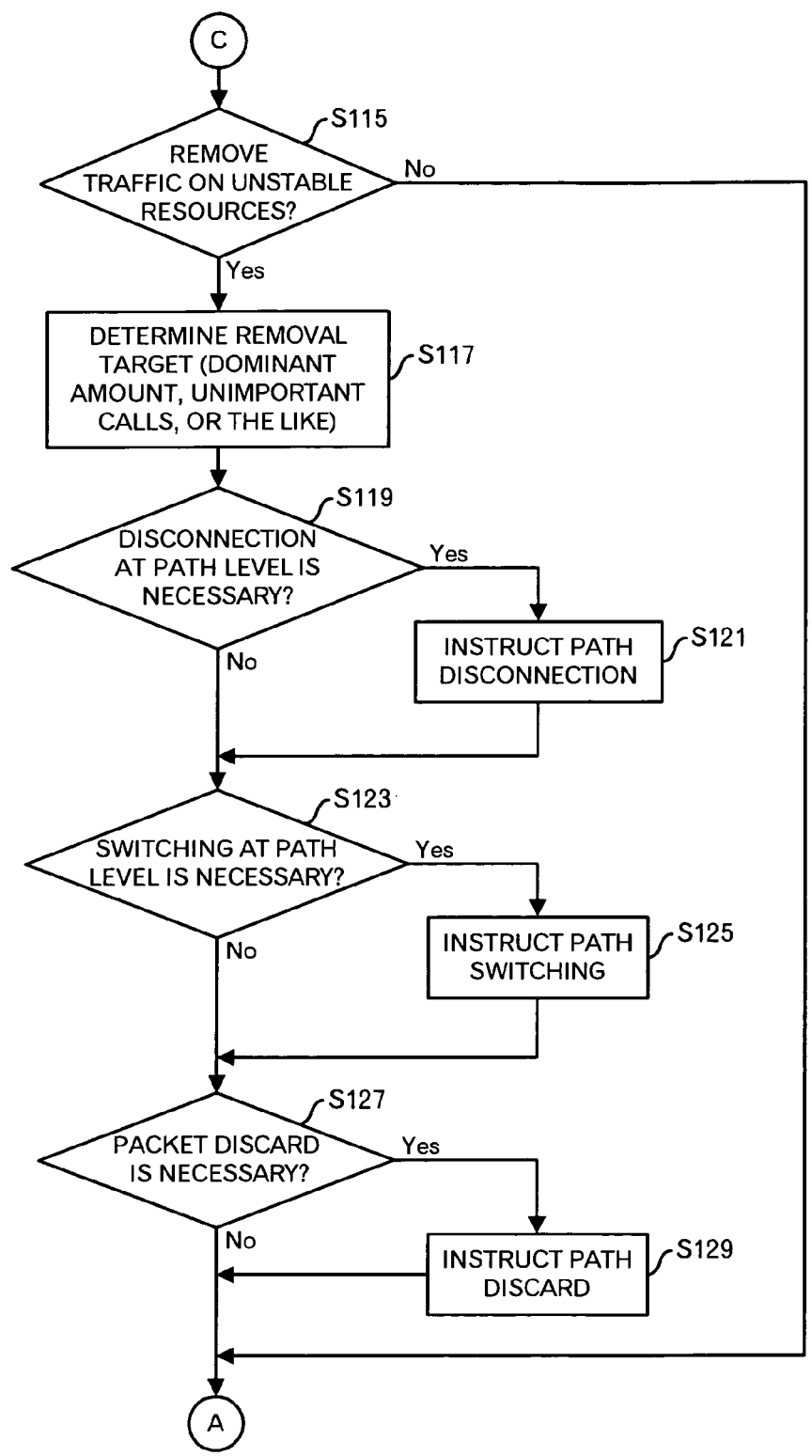
FIG. 31 is a diagram showing a processing flow (second portion) executed instead of FIG. 8.

In the aforementioned instance, the difference between the actual traffic and the traffic transition prediction is considered to be a degree of instability, and it is used for routing for searching a stable path after reflecting the difference on the link cost. The controls as shown in FIGS. 30 and 31 may be carried out, however. More specifically, for example, after the terminal A in FIG. 8, the traffic transition predictor 515 judges whether or not U(0)−P(0) is more than or equal to the threshold at a certain rate or higher (step S101) When U(0)−P(0) is not more than or equal to the threshold at the certain rate or higher, the state is determined to be stable and then the processing is terminated via the terminal B (step S103). On the other hand, when U(0)−P(0) is more than or equal to the threshold at the certain rate or higher, the state is determined to be unstable (step S105) and then U(0)−P(0) is reflected on costs so as to represent the stability (step S107). When a direct control is not applied (step S109: NO route), the processing is terminated via the terminal B. On the other hand, when the direct control is applied (step S109: YES route), the traffic transition predictor 515 judges whether or not new requests should be forcibly restricted (step Sill) For example, the judgment is made according to whether there is already a setting for the forcible restriction. When the new requests should be forcibly restricted, as an admission control, the requests going to use the unstable resources are forcibly rejected (step S113). In this manner, when the unstable state occurs, the new requests going to use the resource may be forcibly rejected until the resource returns to the stable condition. When it is determined that the new requests should be forcibly restricted in the step S111 or after the step S113, the processing shifts to the processing shown in FIG. 31 via a terminal C.

Then, shifting to the description of the processing in FIG. 31, the traffic transition predictor 515 judges whether or not the traffic on the unstable resources should be removed (step S115). For example, the judgment is made according to whether there is already a setting for removing the traffic on the unstable resources. When it is determined that the traffic on the unstable resources should be removed, the processing returns to the step S101 via the terminal A. On the other hand, when it is determined that the traffic on the unstable resources should be removed, the traffic transition predictor 515 determines the removal target (a call having a large traffic volume, an unimportant call, and the like) according to a predetermined rule (step S117). Thereafter, the traffic transition predictor 515 judges whether a disconnection at the path level (a connection or a path) is necessary according to a predetermined criterion (step S119). When it is determined as being necessary, the traffic transition predictor 515 issues an instruction for disconnecting the path to carry out a forcible disconnection until the resources return to the stable condition (step S121). When it is determined that the disconnection at the path level is unnecessary or after step S121, the traffic transition predictor 515 judges whether or not switching at the path level is necessary according to a predetermined criterion (step S123). When it is more desirable to switch traffic from the unstable connection or path to a stable connection or path that is an alternative to the unstable one, the traffic transition predictor 515 issues a path switching instruction (step S125). Moreover, when it is determined that the switching at the path level is unnecessary or after the step S125, the traffic transition predictor 515 judges whether or not the packet needs to be discarded according to a predetermined criterion (step S127). When the node needs to discard the packet flowing through the connection or path without disconnecting the connection or path, the traffic transition predictor 515 issues a packet discard instruction (step S129). Then, the processing returns to the step S101 in FIG. 30 via the terminal A. When the packet discard is unnecessary, the processing returns to the step S101 in FIG. 30 via the terminal A.

As for a method of selecting the connection or path to be forcibly disconnected, there is a method of maintaining a preset priority, for example, retaining communications between preregistered sender and receiver and important calls, while forcibly disconnecting connections and paths used in other communications. Besides, there is a method of selecting the connection or path in such a way that the difference between the actual traffic and the traffic transition prediction is within a certain range in the descending order of the utilized bandwidths.

By carrying out the aforementioned processing, the network control server 5 can grasp, for example, a traffic concentration trend at the occurrence of an event and a periodic traffic change as knowledge. More specifically, the network control server 5 can predict a traffic concentration level at the next similar event. Therefore, a resource allocation prepared for the traffic concentration and the like increases the resource utilization efficiency of the network, whereby it becomes possible to support a lot of requirements and to prevent opportunity loss. Moreover, it is possible to avoid wasteful equipment investment. This availability indirectly leads to consideration to environmental friendliness.

Moreover, when there is a significant difference from a traffic volume derived from the past knowledge, it is assumed that some abnormality occurs. Therefore, by allocating higher cost values to links or servers on this trend and searching for a minimum cost path on the basis of these cost values, the network control server 5 can select a path being high in stability and safety.

C. Path Control Using Traffic Transition Prediction

In this embodiment, a path control is carried out by using the result of the traffic transition prediction. The outline of the path control will be described, first, with reference to FIG. 9A to FIG. 21.

Figures 9A, 9B:
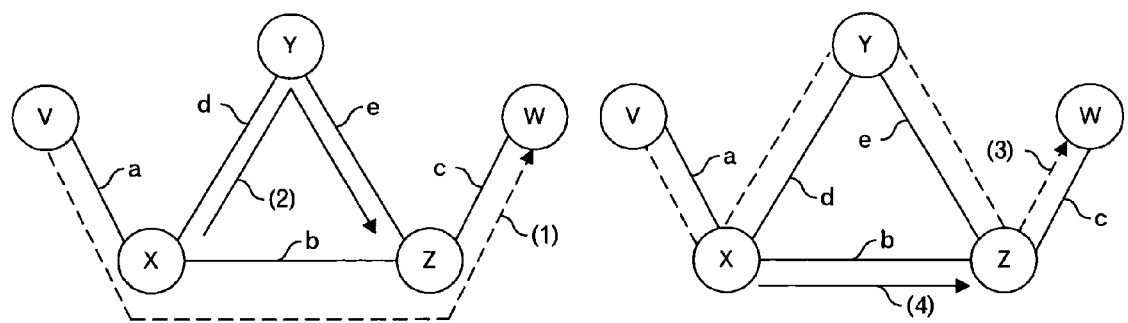
FIG. 9A is a diagram showing routing to explain a problem of a first specific example.
FIG. 9B is a diagram showing the routing in the first specific example.

As shown in FIG. 9A, a condition is assumed where there are a link a between a node V and a node X, a link d between the node X and a node Y, a link b between the node X and a node Z, a link e between the node Y and the node Z, and a link c between the node Z and a node W. In this condition, when a connection set-up request from the node V to the node W is received first, conventionally the minimum cost path at that time, namely, a path (1) using the link a, the link b, and the link c is allocated to the connection set-up request. When receiving a connection set-up request from the node X to the node Z thereafter, the link b has already been used and therefore the cost of the link b is higher than when receiving the first connection set-up request, and therefore a path (2) using the link d and the link e is allocated to the subsequent connection set-up request. When, however, the traffic volume used for the subsequent connection set-up request is larger, it is undesirable that the traffic having a long holding time occupies an alternative path like the path (2), for example, from the viewpoint of the utilization efficiency of the entire network, because other traffic cannot use these two links partially forming the path (2).

When it can be predicted that an intensive traffic demand will occur within a certain time period between certain nodes, it is desirable to allocate the shortest path to the mass traffic demand, from the viewpoint of the utilization efficiency of the entire network. In order to allocate the shortest path to the mass traffic demand, it is necessary to inhibit the allocation of the shortest path to traffic other than the traffic between the certain nodes after a certain time period previous to the time when the intensive traffic demands begin. More specifically, it is only necessary to make the costs of the links on the shortest path look higher to the traffic other than the traffic between the certain nodes.

More specifically, when it can be previously known that the mass traffic occurs from the node X to the node Z from the traffic transition prediction, as shown in FIG. 9B, the cost of the link b is previously set high so as to prevent the allocation of the link b extending from the node X to the node Z to the first connection set-up request, and a path (3) including the link a, the link d, the link e, and link c is allocated to the first connection set-up request. On the other hand, the subsequent connection set-up request is nothing other than the mass traffic predicted in the traffic transition prediction, and therefore a path (4) composed of the link b is allocated to the subsequent connection set-up request according to the current cost. This improves the utilization efficiency of the entire network, thereby achieving effective utilization of the resources.

The utilization efficiency of the entire network will be described below with reference to FIG. 10. Assuming that only the nodes X, Y, and Z exist, all combinations of the nodes and paths therefor are listed in the column of Source and Destination Nodes and the column of Path in FIG. 10. Then, when the traffic transition prediction is not considered, the path is formed from the node X to the node Z via the node Y by using the links d and e as described above. On the other hand, when the traffic transition prediction is considered, the path is formed from the node X to the node Z directly by using the link b. Then, in each of the cases where the traffic transition prediction is not considered and where the traffic transition prediction is considered, a cross mark (×) is given if a corresponding path is affected because of the overlap with the aforementioned paths, and a circle (○) is given unless a corresponding path is affected because the overlap with the aforementioned paths, for each source and destination node pair and for each path. Incidentally, a crossbar (−) indicates a path of the traffic itself. Unless the traffic transition prediction is considered, there are four cross marks. If the traffic transition prediction is considered, there are two cross marks. Therefore, the paths are less affected if the traffic transition prediction is considered. In other words, it is understood that the utilization efficiency of the entire network is improved, thereby achieving an effective use of the resources.

Figures 10, 11A, 11B:
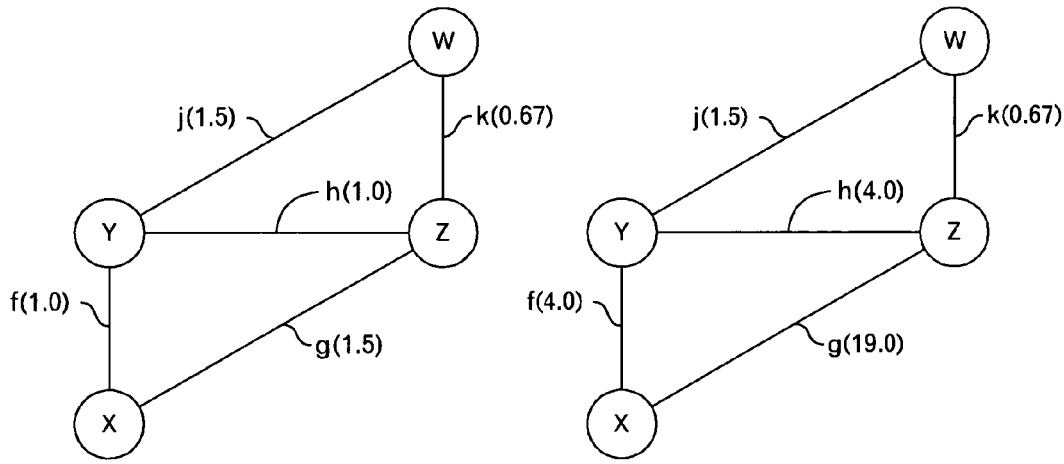
FIG. 10 is a diagram showing effects of the first specific example.
FIGS. 11A and 11B are diagrams showing an example of cost settings.

Next, the following describes what cost setting should be made with reference to FIGS. 11A and 11B. First, the cost setting will be described by using FIG. 11A, in the situation where a connection set-up request from the node X to the node Z is received when the intensive traffic from the node X to the node Z is predicted according to the traffic transition prediction. Incidentally, a delay time is used as the cost, the cost can be approximated by $a/(1-a)$ where a is the utilization rate of the link. More specifically, assuming that the utilization rate of a link f, a link g, a link h, a link j, and a link k are 0.5, 0.6, 0.5, 0.6, and 0.4, respectively, the cost of the link f between the node X and the node Y, the cost of the link g between the node X and the node Z, the cost of the link h between the node Y and the node Z, the cost of the link j between the node Y and the node W, and the cost of the link k between the node Z and the node W are 1.0, 1.5, 1.0, 1.5, and 0.67, respectively, as shown in FIG. 11A.

In the case where the connection set-up request is received from the node X to the node Z when the intensive traffic is predicted from the node X to the node Z in the traffic transition prediction, the path is identified by using the normal link costs described above. More specifically, the minimum cost path (cost=0.6) is the path composed of the link g, and the next lowest cost path (cost=0.5+0.5=1.0) is the path composed of the link f and the link h. Therefore, the path composed of the link g is allocated.

Incidentally, if the predicted traffic volume exceeds the upper limit B of the link g, only the link g is insufficient and therefore second and third paths are sequentially used, if necessary.

On the other hand, in the case where a connection set-up request other than the connection set-up request from the node X to the node Z is received, link costs reflecting the traffic transition as shown in FIG. 11B are set, instead of the normal link costs shown in FIG. 11A. In this example, for the connection set-up request of the large traffic from the node X to the node Z, which will arrive in the future, the two paths described above are to be used and therefore the link costs related to the two paths are set higher. More specifically, the costs of the link f, the link g, and the link h are recalculated by using a utilization rate a' derived from the result of the traffic transition prediction. For example, when the utilization rate of the link f increases from 0.5 to 0.8, the cost is 4.0 (=0.8/(1−0.8)). When the utilization rate of the link g increases from 0.6 to 0.95, the cost is 19.0 (=0.95/(1−0.95)). Furthermore, when the utilization rate of the link h increases from 0.5 to 0.8, the cost is 4.0.

Therefore, the minimum cost path from the node X to the node Z is the path including the link f, the link j, and the link k (cost=4.0+1.5+0.67=6.17), and the next lowest cost path is the path including the link f and the link h (cost=4.0+4.0=8.0). Therefore, the link g is not easily selected.

Figures 12A, 12B, 13:
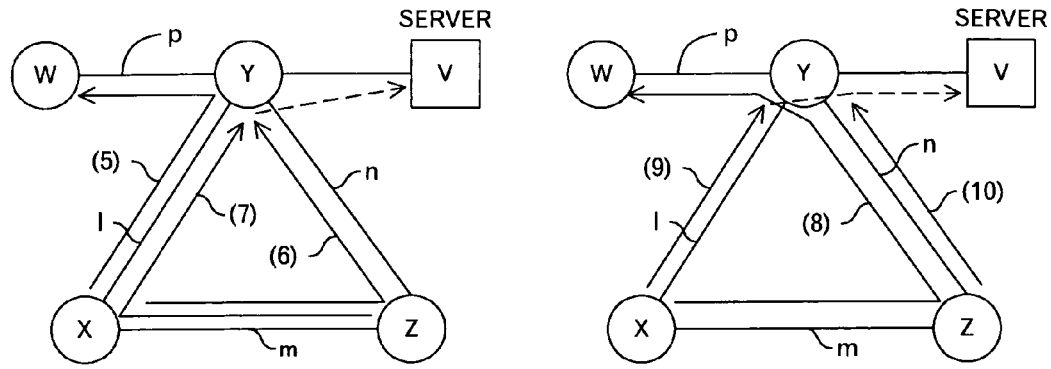
FIG. 12A is a diagram showing routing to explain a problem of a second specific example.
FIG. 12B is a diagram showing the routing in the second specific example.
FIG. 13 is a diagram showing effects of the second specific example.

Another example is shown in FIGS. 12A and 12B provided to make this example easier to understand. As shown in FIG. 12A, it is assumed that there are a link m between a node X and a node Z, a link l between the node X and a node Y, and a link p between the node Y and a node W, and the node Y is connected to a server V. In this condition, upon receiving a connection set-up request from the node X to the node W, first, a path (5) including the link l and the link p is allocated to the connection set-up request. In the case where a connection set-up request from the node X to the server V is received thereafter, the cost of the link l increases due to the path allocated according to the first connection set-up request, and therefore a path (6) including the link m and the link n is allocated to the second connection set-up request. In the case where a connection set-up request from the node Z to the server V is received thereafter, the cost of the link n increases due to the effect of the paths allocated earlier, and therefore a path (7) including the link m and the link l is allocated to the third connection set-up request. The reason why the link l is used is that the cost is lower than when the link n is used.

For example, when it can be predicted that the intensive traffic demand will occur within a certain time period in the server V by carrying out the traffic transition prediction, the utilization efficiency of the entire network is improved by allocating the shortest path to the traffic demand for the server V. For example, when a popular concert ticket sale starts at the server V, it can be predicted that mass traffic to the server V occurs. Therefore, the routing described hereinafter is preferable.

Specifically, as shown in FIG. 12B, when receiving a connection set-up request from the node X to the node W first, the costs of the link l and the link n are set higher on the basis of the result of the traffic transition prediction that the traffic volume to the server V will increase, and therefore a path (8) including the link m, the link n, and the link p is allocated to the connection set-up request. On the other hand, when receiving a connection set-up request from the node X to the server V thereafter, the connection set-up request falls under the traffic transition prediction, and therefore the costs of the link l and the link n are normally set based on current utilization data and a path (9) composed of the link l is allocated to the connection set-up request. When receiving a connection set-up request form the node Z to the server V, the connection set-up request also falls under the traffic transition prediction, and therefore the costs of the link l and the link n are normally set (note that, however, the allocation to the previous connection set-up request is reflected on the link l) and a path (10) composed of the link n is allocated to the connection set-up request. This enables the shortest path to be allocated to the mass traffic to the server V, and also enables alternative paths to be allocated to other connection set-up requests, thereby improving the usage efficiency of the entire network and achieving an effective use of the resources.

The usage efficiency of the entire network will be described below with reference to FIG. 13. Assuming that only the nodes X, Y, and Z exist, all combinations of the nodes and paths therefor are listed in the column of Source and Destination Nodes and the column of Path in FIG. 13. When the traffic transition prediction is not considered, the path from the node X to the server V includes a path formed from the node X to the node Y via the node Z by using the link m and the link n as described above. Moreover, when the traffic transition prediction is not considered, the path from the node Z to the server V includes a path formed from the node Z to the node Y via the node X by using the link m and the link l as described above. On the other hand, when the traffic transition prediction is considered, the path from the node X to the server V includes a path formed directly from the node X to the node Y by using the link l as described above. Similarly, the path from the node Z to the server V includes a path formed directly from the node Z to the node Y by using the link n. Then, in each of the cases where the traffic transition prediction is not considered and where the traffic transition prediction is considered, a cross mark (x) is given if a corresponding path is affected because of the overlap with the aforementioned paths and a circle (○) is given unless a corresponding path is affected because of the overlap with the aforementioned paths, for each source and destination node pair and for each path. Incidentally, a crossbar (−) indicates a case where a corresponding path completely matches one of the aforementioned paths. Unless the traffic transition prediction is considered, there are eight cross marks. If the traffic transition prediction is considered, there are four cross marks. Therefore, the paths are less affected if the traffic transition prediction is considered. In other words, it is understood that the usage efficiency of the entire network is improved, thereby achieving an effective use of the resources.

More specifically, the following instances are conceivable. Incidentally, it is assumed here that an amount of traffic flowing through a node I, a node J, and a node K in this order is denoted by a(IJK). Furthermore, it is assumed that an upper limit B of the bandwidth is set for every link.

First, comparison will be made between the amounts of traffic that can flow along the paths from the node Y to the node X. According to FIG. 13, when using the direct path from the node Y to the node X, a traffic volume a(YX)<B can flow without being affected by other traffic volumes in both cases where the traffic transition prediction is considered and not considered. On the other hand, when using the path from the node Y to the node X via the node Z, the traffic is affected by a traffic volume a (ZXY) of the path (7) unless the traffic transition prediction is considered, and a(YZX)=B−a(ZXY) is derived. Therefore, if a(ZXY)=B, a(YZX)=0. If, however, the traffic transition prediction is considered, the traffic is not affected. Specifically, an inequality relation a(YZX)<B is obtained and therefore data can be transmitted according to the traffic demand.

When the traffic is affected by the traffic volume a(ZXY) of the path (7) as described above, a(YZ)+B−a(ZXY) is derived, and a(YZ)<B in the worst case. On the other hand, unless the traffic is affected by the traffic volume a(ZXY), a(YZ)+z (YZX)<2B. Therefore, in an extreme case, when the shortest path to the server V is allocated in consideration of the traffic transition prediction, double traffic can flow along the path from the node Y to the node X.

Subsequently, comparison will be made between the amounts of traffic that can flow along the paths from the node X to the node Z. According to FIG. 13, the path from the node X to the node Z via the node Y is affected by the traffic volume a(ZXY) of the path (7) or the traffic volume a(XY) of the path (9) in both cases. Unless the traffic transition prediction is considered, the traffic is affected by a(ZXY) and thus a(XYZ)=B−a(ZXY). Therefore, if a(ZXY)=B, a(XYZ)=0. Also, if the traffic transition prediction is considered, the traffic is affected by a(XY) and thus a (XYZ)=B−a(XY) Therefore, if a(XY)=B, a(XYZ)=0.

On the other hand, the direct path from the node X to the node Z is affected by a traffic volume a(XZY) of the path (6) unless the traffic transition prediction is considered, and thus a(XZ)=B−a(XZY). Therefore, if a(XZY)=B, a(XZ)=0. If the traffic transition prediction is considered, the traffic is not affected by a (XZY), and therefore the traffic of the traffic volume a(XZ)<B can flow directly.

As described above, unless the traffic transition prediction is considered, both of a (ZXY) and a (XZY) can be B in B−a(ZXY)+B−a(XZY). If so, the traffic volume of the traffic that can flow along the path from the node X to the node Z may be zero in the worst case. If the traffic transition prediction is considered, B−a(XY)+a(XZ) is derived. Because a(XY) may be equal to B in the worst case, the traffic volume of the traffic that can flow along the direct path from the node X to the node Z, namely, a(XZ) is less than B (a(XZ)<B). When comparing with the worst value, a(XZ)<B is compared with 0. Therefore, the consideration of the prediction has a profound effect.

Other cases can be examined in the same manner. The shortest path can be allocated to subsequent intensive traffic to a certain server by using the traffic transition prediction, thereby considerably improving the entire traffic volume.

Incidentally, roughly explaining the idea, there are three bi-directional links in this triangular net, each of which can carry the traffic whose amount is B, and therefore the triangular net can carry the maximum traffic of 6B. In other words, when a(XY)=a(XZ)=a(YZ)=a(ZX)=a(YX)=a(ZY)=B, the traffic allocation satisfies the maximum efficiency. When, however, two links to the node Y, namely, to the server V are used, which causes a(XZY)=a(ZXY)=B, a(XZ)=a(ZY)=a (ZX)=a(XY)=B is derived, and therefore only the links from the node Y to the node X and from the node Y to the node Z remain. Specifically, in this case, traffic flows at a maximum of 4B. In other words, by utilizing the traffic transition prediction, the traffic flows 1.5 (6/(6−2)=1.5) times, in total, more than the case where the prediction is not used.

Figures 14A, 14B:
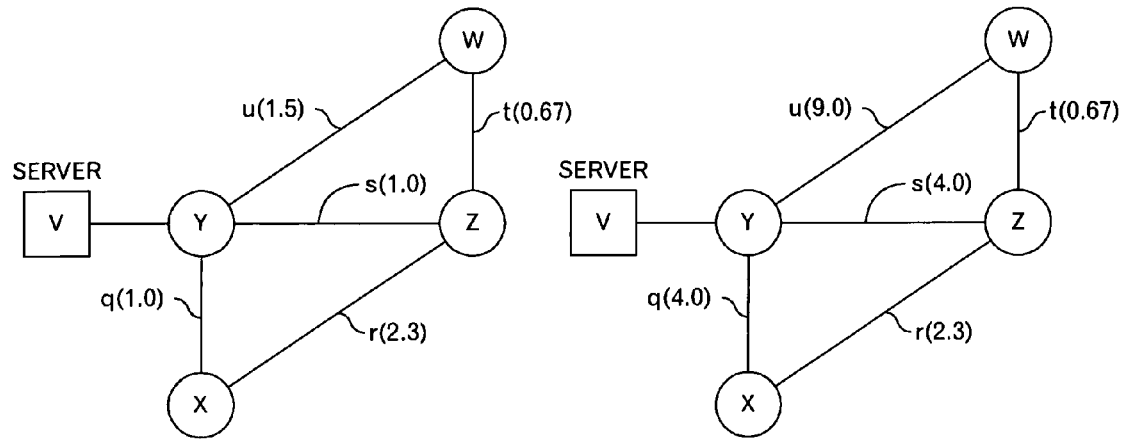
FIGS. 14A and 14B are diagrams showing another example of cost settings.

The following describes what cost setting should be made with reference to FIGS. 14A and 14B. First, the cost setting will be described by using FIG. 14A, in the situation where a connection set-up request to the server V is received when the intensive traffic to the server V is predicted according to the traffic transition prediction. In the example shown in FIG. 14A, the cost of a link q between the node X and the node Z, the cost of a link r between the node X and the node Z, the cost of a link s between the node Y and the node Z, the cost of a link u between the node Y and the node W, and the cost of a link t between the node Z and the node W are 1.0, 2.3, 1.0, 1.5, and 0.67, respectively. The cost is the delay time and can be approximated by a/(1−a) where a is the utilization rate of the link. More specifically, the aforementioned cost values are calculated assuming that the utilization rates of the link q, the link r, the link s, the link t, and the link u are 0.5, 0.7, 0.5, 0.4, and 0.6, respectively.

In the case where the connection set-up request to the server V is received when the intensive traffic to the server V, that is, the node Y, is predicted in the traffic transition prediction, the path is identified by using the normal link costs described above. More specifically, the minimum cost path from the node X to the server V is the path composed of the link q, the minimum cost path from the node Z to the server V is the path composed of the link s, and the minimum cost path from the node W to the server V is the path composed of the link u.

On the other hand, in the case where the connection set-up request to the destination other than the server V is received, (a) a higher cost value is given to links having less hops to the server V, and (b) an increment of the utilization rate is allocated to each of the links directly connected to the node Y to which the server V is connected. More specifically, when the utilization rate of the server V is 0.9, an increment 0.3 (=0.9/3) is evenly added to the utilization rates of the link u, the link s, and the link q, which are directly connected to the node Y. Thereby, as shown in FIG. 14B, the utilization rate of the link u is 0.9 (0.6+0.3=0.9) and thereby the cost is 9.0, the utilization rate of the link s is 0.8 (0.5+0.3=0.8) and thereby the cost is 4.0, and the utilization rate of the link q is 0.8 (0.5+0.3=0.8) and thereby the cost is 4.0. According thereto, the costs of the link r and the link t, which are not directly connected to the node Y, remain unchanged and the links not directed to the node Y are relatively low in cost. Therefore, these links are used more often than other links.

A processing flow for achieving the aforementioned specific example will be described with reference to FIGS. 15 to 21. The terminal 7 transmits a connection set-up request including a destination address and the like to the network control server 5. The request receiver 531 of the network controller 53 in the network control server 5 receives the connection set-up request from the terminal 7. The request receiver 531 generates a path search request including a source address or an address or ID of an edge router of a source, the destination address or an address or ID of an edge router of a destination, a required bandwidth, a predicted holding time, and so on from the received connection set-up request, and then outputs the path search request to the minimum cost path search processor 517 of the network context processor 51. The predicted holding time is the time during which the connection between the source and the destination is predicted to be continued. The required bandwidth may be included in the connection set-up request or may be estimated from the destination address or the like.

The minimum cost path search processor 517 of the network context processor 51 receives the path search request from the request receiver 531 (step S31). Incidentally, the predicted holding time and the required bandwidth may be estimated by the minimum cost path search processor 517. In addition, the minimum cost path search processor 517 reads out data of an operational policy to be applied from the operational policy storage 55 (step S33). In this embodiment, the operational policy includes setting data such as whether or not a processing using the traffic transition prediction is carried out, whether or not a conditional graph is generated, and conditions to prune nodes and servers on the conditional graph.

Thereafter, the minimum cost path search processor 517 reads out network topology graph data from the network topology data storage 519 (step S35). Furthermore, it judges whether or not the conditional graph is set to be required in the operational policy (step S37). When the conditional graph is not set to be required, the processing shifts to step S43. On the other hand, when the conditional graph is set to be required, the minimum cost path search processor 517 carries out a conditional graph generation processing (step S39). This processing will be described in detail later by using FIG. 16. Thereafter, the minimum cost path search processor 517 judges whether or not nodes and servers have been pruned under all the required conditions (step S41). For example, nodes and servers are pruned on the basis of stability and further nodes and servers are pruned on the basis of utilization rates or the like. When nodes and servers have been pruned under all the required conditions, the processing returns to the step S39. On the other hand, when nodes and servers have been pruned under all the required conditions, the processing shifts to the step S43.

In the step S43, the minimum cost path search processor 517 determines whether or not the minimum cost path selection is required. When the minimum cost path selection is not determined to be required, the processing shifts to step S49. On the other hand, when the minimum cost path selection is determined to be required, the minimum cost path search processor 516 carries out a minimum cost path search processing (step S45). This processing will be described later by using FIG. 21. Thereafter, the minimum cost path search processor 517 outputs a path search result obtained in the step S45 to the setting processor 533 of the network controller 53 as a notice of the path search result (step S47). Upon receiving the notice of the path search result from the minimum cost path search processor 517, the setting processor 533 carries out settings for the corresponding routers in the network 1 according to the path search result. The aforementioned processing is repeated until the processing end event occurs (step S49).

Subsequently, the conditional graph generation processing will be described with reference to FIGS. 16 to 20. First, the minimum cost path search processor 517 obtains the conditions for the path search request from the path search request received from the request receiver 531 (step S51). These conditions include the destination address and the like, the predicted holding time, and the required bandwidth. The conditions, however, may include the source address and the like in some cases. Furthermore, the minimum cost path search processor 517 obtains related traffic transition prediction data from the traffic transition prediction result storage 516 on the basis of the predicted holding time, and the destination address or the destination address and the source address and the like (step S52).

The traffic transition prediction result storage 516 stores the ID of the destination edge router related to the connection set-up request that increases the traffic volume related to the link or server, or the ID of the destination edge router and the ID of the source edge router, or the server address or ID in the case of the server, and a traffic volume or a utilization rate per unit time for each link or server and for each unit time, as traffic transition prediction data.

The processing to be carried out next is to identify whether or not the optimal path search should be carried out for the request by using the traffic transition prediction. As described above, when large traffic can be predicted to occur in the future and the connection set-up request is a cause of such large traffic, the minimum cost path at the current time is allocated to the connection set-up request, and therefore the prediction result of the traffic transition is not used. Conversely, when the connection set-up request is a request other than the cause of the large traffic, the traffic transition prediction is used to allocate the minimum cost path, where it is assumed that the large traffic occurs, in order to reserve the current minimum cost path to the large traffic.

Such a strategy will be described by using the aforementioned example. As described with reference to FIGS. 11A and 11B, when the large traffic can be predicted to occur from the node X to the node Z in FIG. 9 and the connection set-up request is the cause of the large traffic, in other words, the source and destination edge routers are X and Z, the minimum cost path at the current time is allocated to the connection set-up request and therefore the prediction result of the traffic transition is not used. As a result, the path is determined on the basis of the link costs shown in FIG. 11A. Conversely, when the connection set-up request is not the cause of the large traffic, in other words, when the source and destination edge routers are not X and Z, the traffic transition prediction is used to allocate the minimum cost path, which is determined on the assumption that the large traffic will be sent. As a result, the path is determined on the basis of the link costs shown in FIG. 11B.

Similarly, as described with reference to FIGS. 14A and 14B, when the large traffic can be predicted to occur at the server V in FIG. 12 and the connection set-up request is the cause of the large traffic, in other words, the accessed server is the server V, the minimum cost path at the current time is allocated to the connection set-up request and therefore the prediction result of the traffic transition is not used. As a result, the path is determined on the basis of the link costs shown in FIG. 14A. Conversely, when the connection set-up request is not the cause of the large traffic, in other words, when the accessed server is not the server V, the traffic transition prediction is used to allocate the minimum cost path, which is determined on the assumption that the large traffic will be sent. As a result, the path is determined on the basis of the link costs shown in FIG. 14B.

In order to carry out the aforementioned discrimination of the connection set-up request, the following processing is carried out. Specifically, in the step S52, the minimum cost path search processor 517 judges whether or not the traffic transition prediction result storage 516 stores, for each link or server to which the large traffic is to be sent, an ID or destination address of an destination edge router or server, which is identified from the destination address, or an ID or destination address of the destination edge router or server and an ID of the source edge router, which is identified from the source address, within the predicted holding time. As for links for which the ID of the destination edge router or the like is not registered, the minimum cost path search processor 517 reads out the corresponding traffic volume or the like as the traffic transition prediction data. As for links for which the ID of the destination edge router or the like is registered, the minimum cost path search processor 517 reads out the current traffic volume or the like stored in the network context DB 512 as the traffic transition prediction data, instead of the corresponding traffic volume or the like in the traffic transition prediction result storage 516. In the aforementioned example, as for the connection set-up request that increases the traffic volume as in the traffic transition prediction, the minimum cost path search has been carried out at the normal costs. Like the example, in order to apply the normal costs for the links and the like for which the destination edge router or the like is registered, the traffic volume or the like is not read out, and the current traffic volume or the cost value obtained from the static attributes is used. On the other hand, as for links or the like for which the destination edge routers or the like are not registered, the traffic volume or the like of such links is read out to be applied.

Then, the minimum cost path search processor 517 judges whether or not the traffic transition prediction has to be reflected (step S53). In this judgment, it is determined whether or not the operational policy includes a setting such that the traffic transition prediction should be used to carry out the processing and whether the traffic transition prediction data has been read out from the traffic transition prediction result storage 516 in the step S52.

When the operational policy states the setting such that the traffic transition prediction should not be used or when the traffic transition prediction data has not been read out from the traffic transition prediction result storage 516 in the step S52, the minimum cost path search processor 517 sets the cost of each link or each server on the basis of data indicating the current traffic states, which is stored in the network context DB 512 (for example, the current available bandwidth or the current CPU utilization rate) or the static attributes stored in the network topology data storage 519 (a physical distance, the presence or absence of a fault recovery function, the presence or absence of a security protection function, and the like) (step S59). This processing is the same as the conventional one and therefore will not be described here any more. Thereafter, the processing progresses to step S61.

Figure 17:
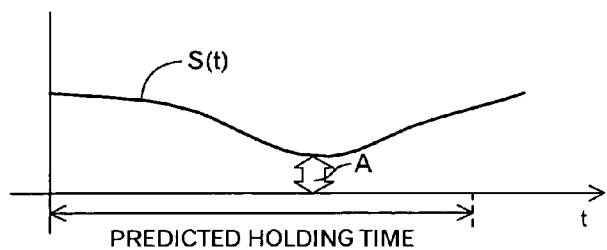
FIG. 17 is a diagram showing a relation among the traffic transition prediction (available bandwidth prediction), predicted holding time, and a value A used for judgment.
Figure 15:
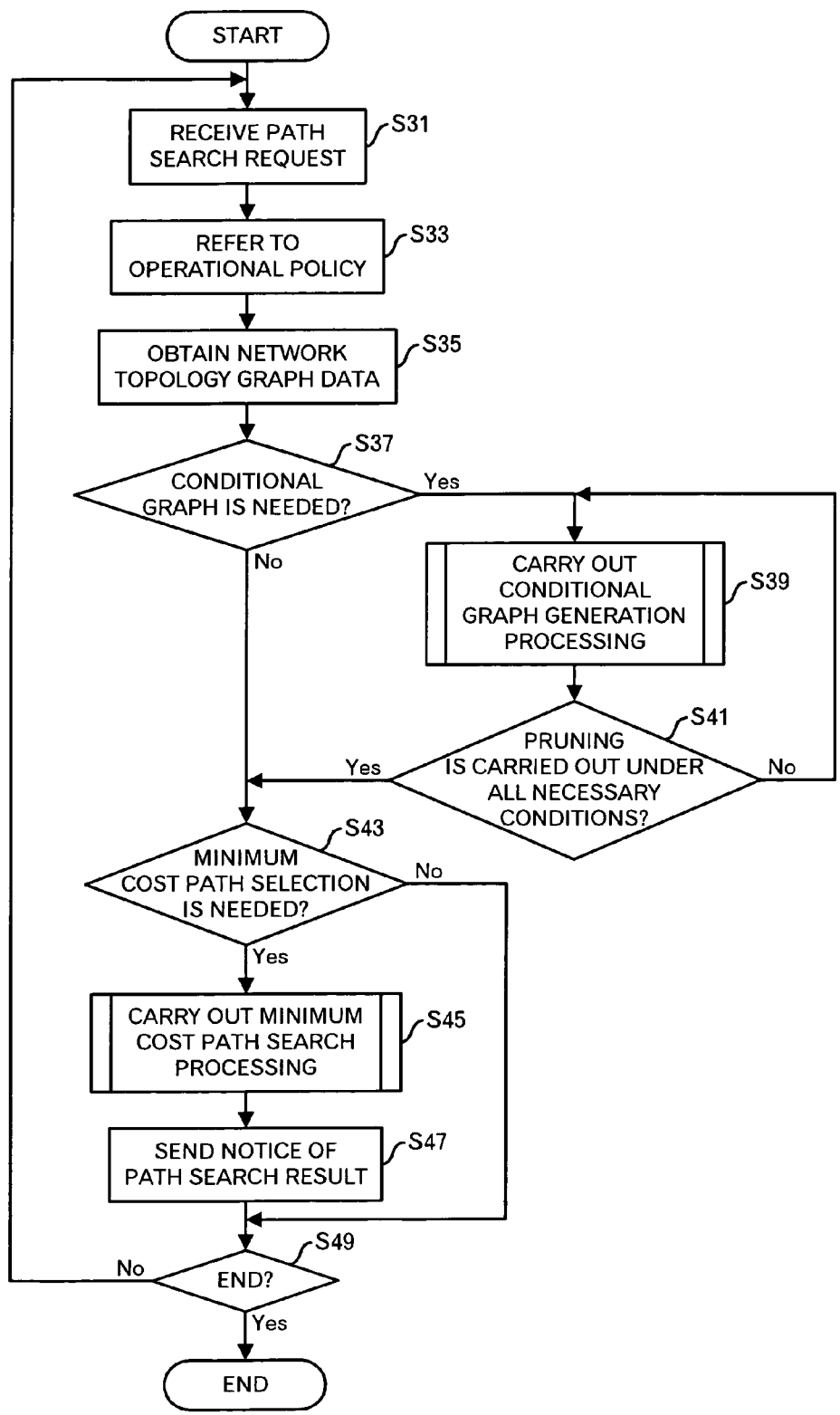
FIG. 15 is a diagram showing a main processing flow of the routing.

On the other hand, when the operational policy includes the setting such that the traffic transition prediction should be used and the traffic transition prediction data has been read out from the traffic transition prediction result storage 516 in the step S52, the minimum cost path search processor 517 sets the cost of each link or each server on the basis of the traffic transition prediction (step S57). For example, the traffic transition prediction data (an available bandwidth, performance, or the like) S(t) as shown in FIG. 17 is assumed to be read out in the step S52. In FIG. 17, the axis of abscissa represents time and the axis of ordinate represents an available bandwidth or performance. The cost set in the step S57 is determined on the basis of the least available bandwidth or performance A in the predicted holding time. Incidentally, the available bandwidth or performance may be directly used as the cost.

After the step S59 or the step S57, the minimum cost path search processor 517 selects one unprocessed link or server from the network topology graph (step S61), and judges whether or not the cost set in the step S59 or the step S57 satisfies a condition (for example, a required bandwidth. Other conditions may be set) (step S63). When the cost does not satisfy the condition, the minimum cost path search processor 517 deletes the link or the like selected in the step S61 (step S65). Thereafter, the processing shifts to the step S67. On the other hand, when the cost satisfies the condition, the processing progresses to step S67.

The following discusses a case where there is a network topology graph as shown in FIG. 18A, for example. It is assumed that a reference character R denotes a router and a square (□) denotes a server. For example, when it is determined that the cost set in the step S59 or the step S57 does not satisfy the required bandwidth that is the condition, the link or server is deleted from the network topology graph shown in FIG. 18A, whereby the network topology graph, for example, as shown in FIG. 18B is generated. FIG. 18B shows the situation, with dashed lines, where the links and server have been deleted based on the determination that the cost does not satisfy the required bandwidth that is the condition.

Then, the minimum cost path search processor 517 judges whether or not all links and servers in the network topology graph have been processed (step S67). When there is at least one unprocessed link or server, the processing returns to the step S61. On the other hand, all links and servers have been processed, the processing returns to the original processing.

This enables the cost setting using the traffic transition prediction data and pruning of links and the like according to the cost setting.

While the processing for the bandwidth as a cost has been described in the above, naturally the operational policy may be achieved using other costs. For example, unstable links and servers may be pruned using the instability index described above as a cost, or resources high in utilization rate or resources long in delay time may be pruned using a utilization rate as a cost or a delay time obtained from a function of the utilization rate as a cost.

Incidentally, when the traffic transition prediction is reflected on the costs in the network topology graph, the traffic transition prediction data of links is directly applied to the links. On the other hand, when the cost (load or the like) of a certain application server increases by $+C_a(t)$ due to an event, the increment $+C_a(t)$ of the cost of the application server is distributed to related links as shown in FIG. 19 in some cases. In the example shown in FIG. 19, when the cost of the application server V increases by $+C_a(t)$, $+C_a(t)/3=+C_1(t)$ is allocated to three links 501 to 503 connected to its edge router 500. Furthermore, the link 501 is connected to one link 507 and $+C_1(t)$ is also allocated to the link 507. Similarly, the link 502 is connected to one link 506 in the direction of getting away from the application server V, and $+C_1(t)$ is also allocated to the link 506. The link 503 is connected to a link 505 and a link 504, and $+C_1(t)/2=+C_2(t)$ is allocated to each of that links. The link 507 is connected to a link 5009 and a link 508, and $+C_1(t)/2=+C_2(t)$ is allocated to each of that links.

Figure 20A:
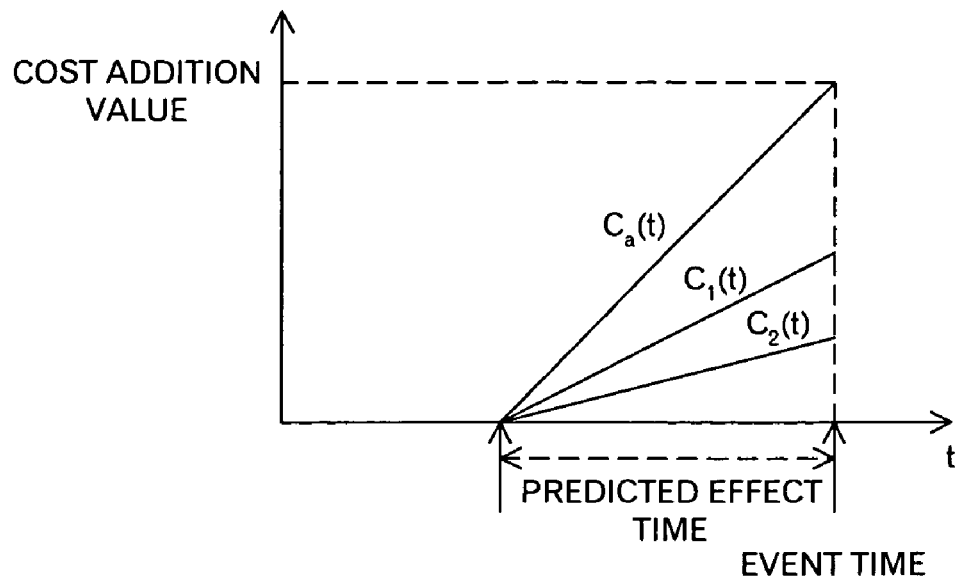
FIGS. 20A and 20B are diagrams to explain a volume of the increment in the server traffic, which is spread over the links.

Looking more closely, various reflection methods are available in terms of time. For example, when the effects of an event are reflected on the cost gradually from before the event time, for example as shown in FIG. 20A, the cost is set so as to increase from 0 to $+C_a(t)$ linearly from the time the predicted effect time earlier to the event time, the cost is set similarly so as to increase from 0 to $+C_1(t)$ linearly, and the cost is set so as to increase from 0 to $+C_2(t)$ linearly. Note that, however, the cost may be set so as to increase along an exponential function or other curves, instead of linearly.

Figure 20B:
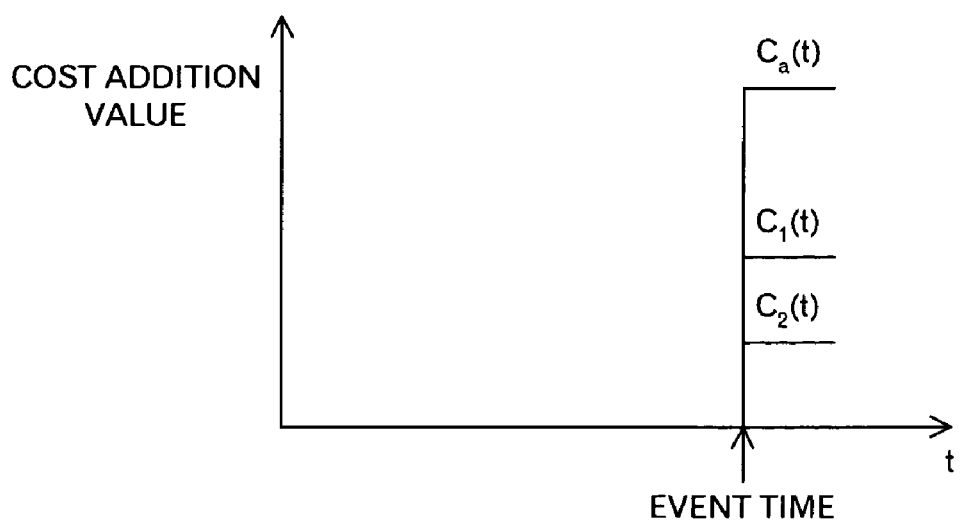

In addition, as shown in FIG. 20B, the cost may be set so as to increase suddenly at the event time from 0 to +$C_a$(t), +$C_1$(t), and +$C_2$(t).

Next, the minimum cost path search processing will be described by using FIG. 21. First, the minimum cost path search processor 517 obtains the conditions for the path search request from the path search request received from the request receiver 531 (step S71). These conditions include a destination address and the like, predicted holding time, and a required bandwidth. The conditions, however, may include a source address and the like in some cases. Furthermore, the minimum cost path search processor 517 obtains related traffic transition prediction data from the traffic transition prediction result storage 516 on the basis of the destination address and the like or the destination address or the like and the source address or the like (step S72).

In the step S72, the minimum cost path search processor 517 judges whether or not the traffic transition prediction result storage 516 stores, for each link or the like, an ID or destination address of an destination edge router or server, which is identified from the destination address, or an ID or destination address of the destination edge router and an ID of the source edge router, which is identified from the source address, within the predicted holding time. As for links for which the ID of the destination edge router or the like is not registered, the minimum cost path search processor 517 reads out the corresponding traffic volume or the like as the traffic transition prediction data. As for links for which the ID of the destination edge router or the like is registered, the minimum cost path search processor 517 reads out the current traffic volume or the like stored in the network context DB 512 as the traffic transition prediction data, instead of the corresponding traffic volume or the like in the traffic transition prediction result storage 516.

Then, the minimum cost path search processor 517 judges whether or not the traffic transition prediction has to be reflected (step S73). In this determination, the minimum cost path search processor 517 judges whether or not the operational policy includes a setting such that the traffic transition prediction should be used for the processing and whether the traffic transition prediction data has been read out from the traffic transition prediction result storage 516 in the step S72. Incidentally, although the traffic transition prediction data is used in the conditional graph generation processing according to the operational policy, it is also possible not to use the traffic transition prediction data for a minimum cost search. Conversely, it is also possible to set the operational policy in such a way as to use the traffic transition prediction data for the minimum cost search, while the traffic transition prediction data is not used in the conditional graph generation processing.

For example, in the conditional graph generation, it is assumed that a graph of links having an available bandwidth equal to or more than the required bandwidth during the predicted holding time is generated and then the path whose delay is the shortest is selected according to the current traffic states from the conditional graph, in consideration of the traffic transition prediction data. This enables selecting a path along which the current traffic flows with least delay from the available links and servers, even taking into account the traffic coming in the future during a specific period.

When the operational policy includes the setting such that the traffic transition prediction should not be used or when the traffic transition prediction data has not been read out from the traffic transition prediction result storage 516 in the step S72, the minimum cost path search processor 517 sets the cost of each link or each server on the basis of data indicating the current traffic states, which is stored in the network context DB 512 (for example, the current available bandwidth, the current CPU utilization rate or the like) or the static attributes (a physical distance, the presence or absence of a safety measure function, the presence or absence of a security function, and the like) stored in the network topology data storage 519 (step S79). This processing is the same as the conventional one and therefore will not be described here any more. Thereafter, the processing progresses to step S81.

On the other hand, when the operational policy includes the setting such that the traffic transition prediction should be used and when the traffic transition prediction data has been read out from the traffic transition prediction result storage 516 in the step S72, the minimum cost path search processor 516 sets the cost of each link or each server on the basis of the traffic transition prediction (step S77).

After the step S79 or the step S77, the minimum cost path search processor 517 identifies a minimum cost path according to the conventional technology, on the basis of the cost set in the step S79 or the step S77 (step S81). More specifically, the path whose delay time is shortest is identified. Incidentally, it is also possible to identify the top five paths and then identify the minimum cost path under another criterion, for example.

Incidentally, as for the minimum cost path search, the following points need to be considered: (1) the path whose sum of link costs is minimum is determined by using, for the link costs, a monotonically increasing function for the utilization rate u=R(t)/Bu with consideration given to the traffic transition prediction; (2) a delay time is approximated by using f(u)=v+uh/(1−u) for the aforementioned link costs, where uh/(1−u) represents waiting time in the queue and v represents a propagation delay; and (3) the maximum value u-max=max{R(t)/Bu} of a utilization rate for a certain period may be used for the link costs.

Furthermore, when a load distribution is carried out, the following points need to be considered: (1) a path whose minimum value of the costs of links constituting a path is highest may be determined by using, for the link costs, an available bandwidth Bu−R(t) with consideration given to the traffic transition prediction; (2) a minimum value min(Bu−R(t)) of the available bandwidth for a certain period may be used for the link costs; (3) a path whose maximum value of link costs is lowest may be determined by using, for the link costs, a function of a utilization rate u=R(t)/Bu with consideration given to the traffic transition prediction; (4) the waiting time may be approximated by using f(u)=u/(1−u) for the link costs, where uh/(1−u), h, and v represent waiting time in the queue, an average packet processing time, and a propagation delay, respectively; and (5) the maximum value u-max=max{R(t)/Bu} of a utilization rate for a certain period may be used for the link costs.

Furthermore, as for a maximum stable path search, the following points need to be considered: (1) a difference d(t)= U(t)−P(t) between the current traffic volume and the primary predicted value in the traffic transition prediction is defined as an instability index, and when it is large, it is assumed that an unpredictable event occurs and thus stability is low (for example, it is interpreted as meaning that, for example, the path is under DDoS attack, a computer virus is going around the path, or an unauthorized access is made through the path; (2) d(t) may be used for the link costs; (3) the path whose sum of link costs is minimum may be determined by using, for the link costs, the maximum value of d(t)/Bu for a certain period; (4) the path whose sum of link costs is minimum may be determined by using ((an integral of d(t)/Bu)/T) for a certain period T for the link costs; (5) as for P(t), when there is no similar event, P(t)=aF(t)G(t) or P(t)=G(t)+bF(t) may be used; (6) when there is a similar event, P(t)=aF(t)H(t) or P(t)=H(t)+bF(t) may be used; and (7) when there is a similar event and a periodic component is large, P(t)=aF(t)(G(t)+H(t)) or P(t)=G(t)+H(t)+bF(t) may be used.

Moreover, when identifying the minimum cost path, paths may be previously selected by the number of paths (a/Bu (the upper limit of the bandwidth per path)) that enables accommodation for the traffic volume a.

Furthermore, the magnitude of traffic is evaluated according to the occurrence frequency, the bandwidth, the average holding time, a data amount as the product of the bandwidth and the holding time.

Moreover, as apparent from the aforementioned description, the cost evaluation is not intended only for links, but a server is treated as a kind of link and its cost is also evaluated.

Figure 16:
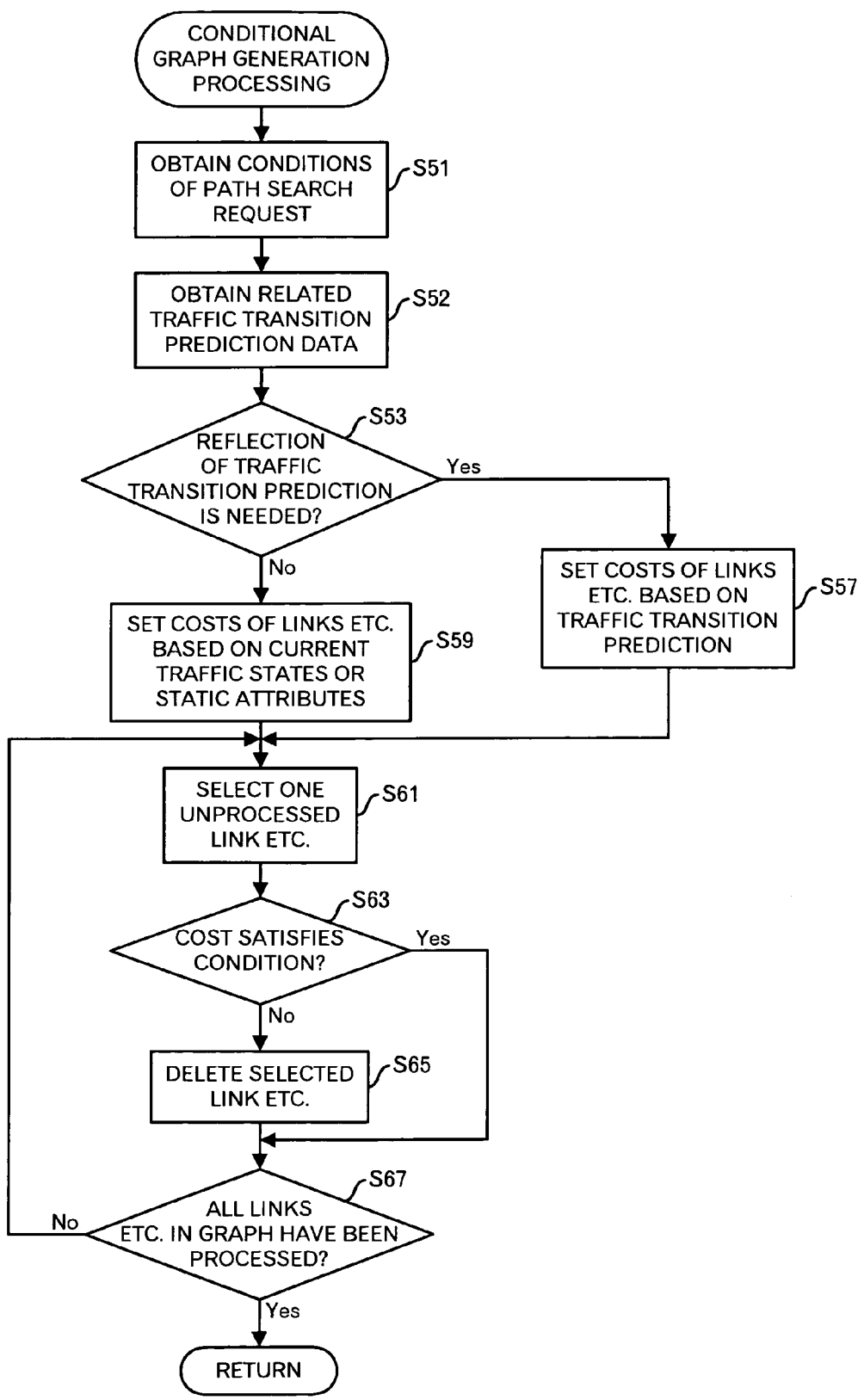
FIG. 16 is a diagram showing a processing flow of a conditional graph generation processing.
Figure 21:
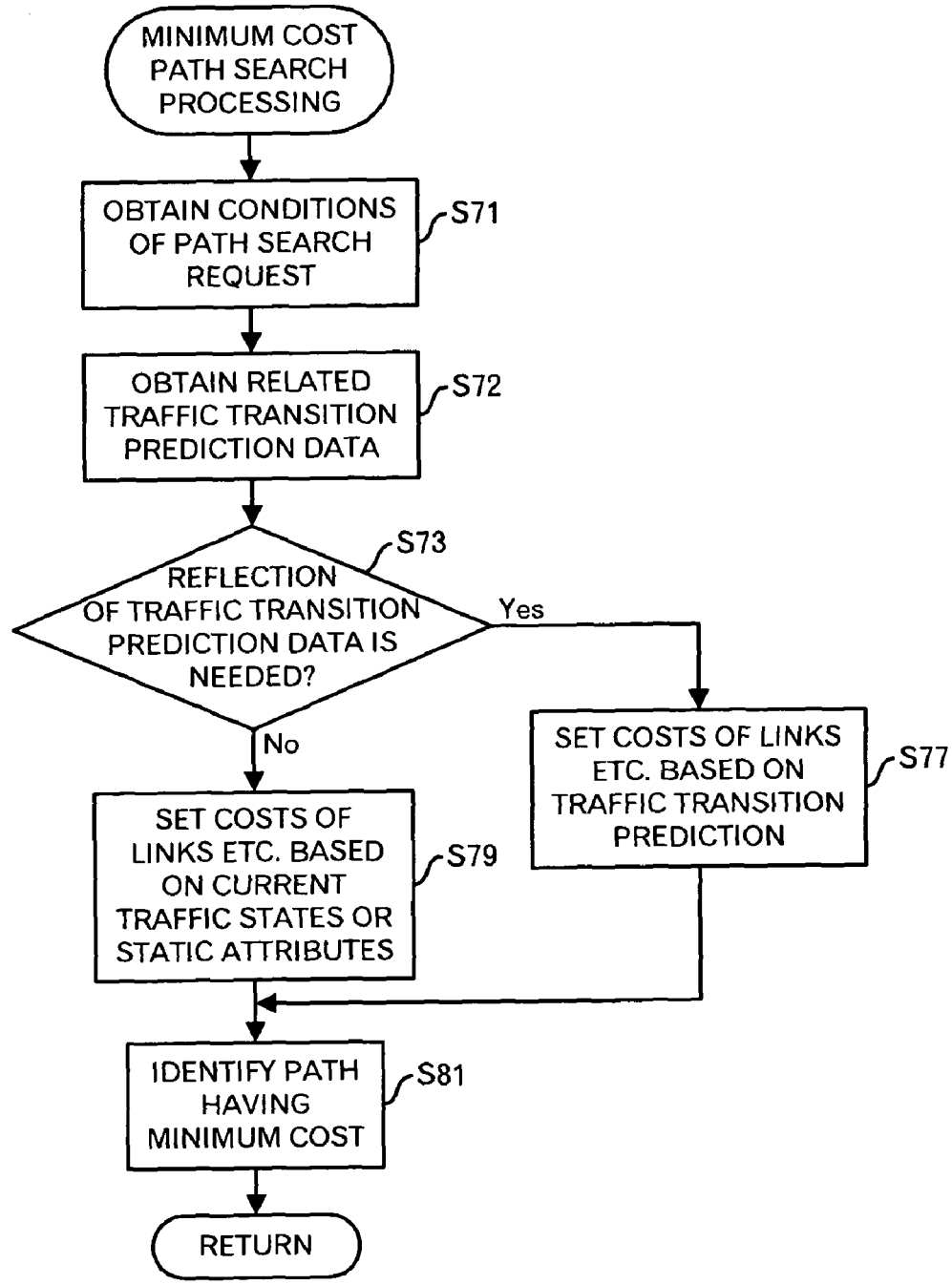
FIG. 21 is a diagram showing a processing flow of a minimum cost path searching.

As described above, in both of the conditional graph generation processing and the minimum cost path search processing, one of the traffic transition prediction, the current traffic conditions, and the static attributes can be arbitrarily selected as an evaluation target, as shown in the step S53 of FIG. 16 and the step S73 of FIG. 21. Furthermore, they can be arbitrarily combined so as to achieve a variety of operations based on the operational policy.

For example, the following processing is performed. First, a link capable of bypassing a trouble or a fault at the occurrence thereof is selected in the conditional graph generation processing. Next, the conditional graph generation processing is repeated in order that only the links and servers each having a certain available bandwidth is remained for a certain period of time. Finally, the most stable path is retrieved among the remained links and servers.

More specifically, in the step S59 of the conditional graph generation processing (FIG. 16), links are pruned by using the costs determined according to the static attributes of whether the links are capable of bypassing at an occurrence of a trouble. Next, in the step S57 of the conditional graph generation processing (FIG. 16), only the links and servers satisfying the reference value are left, by using the minimum value of an available bandwidth during a certain period of time as the costs determined according to the traffic transition prediction as in the step S57 of the conditional graph generation processing (FIG. 16). Finally, in the step S77 of the minimum cost path search processing (FIG. 21), the minimum cost path is calculated by using the costs determined according to the stability obtained from the traffic transition prediction.

As another example, the following processing is carried out when searching for a path whose delay related to a connection set-up request is the lowest value during the holding time, from the links and servers maintaining a certain stability level at the current time.

Specifically, in the step S57 of the conditional graph generation processing (FIG. 16), the stability levels of the links and servers are obtained using the traffic transition prediction to generate a conditional graph having only the links and servers satisfying a certain stability level. Next, in the step S77 of the minimum cost path search processing (FIG. 21), the minimum cost path is identified by using the worst delay as a cost according to the traffic transition prediction of the requested path during the holding time.

By carrying out the processing described hereinabove, it becomes possible to identify the minimum cost path on which the traffic transition prediction data is reflected, thereby achieving the effects of the aforementioned specific examples.

More specifically, the knowledge (network context) obtained through the network operational experience is applicable in a wider sphere. By checking out how the current traffic flow changes from the network context, application servers and links that meet the required criteria are selected, for example. This improves availability and stability.

D. Network Model

Figure 22:
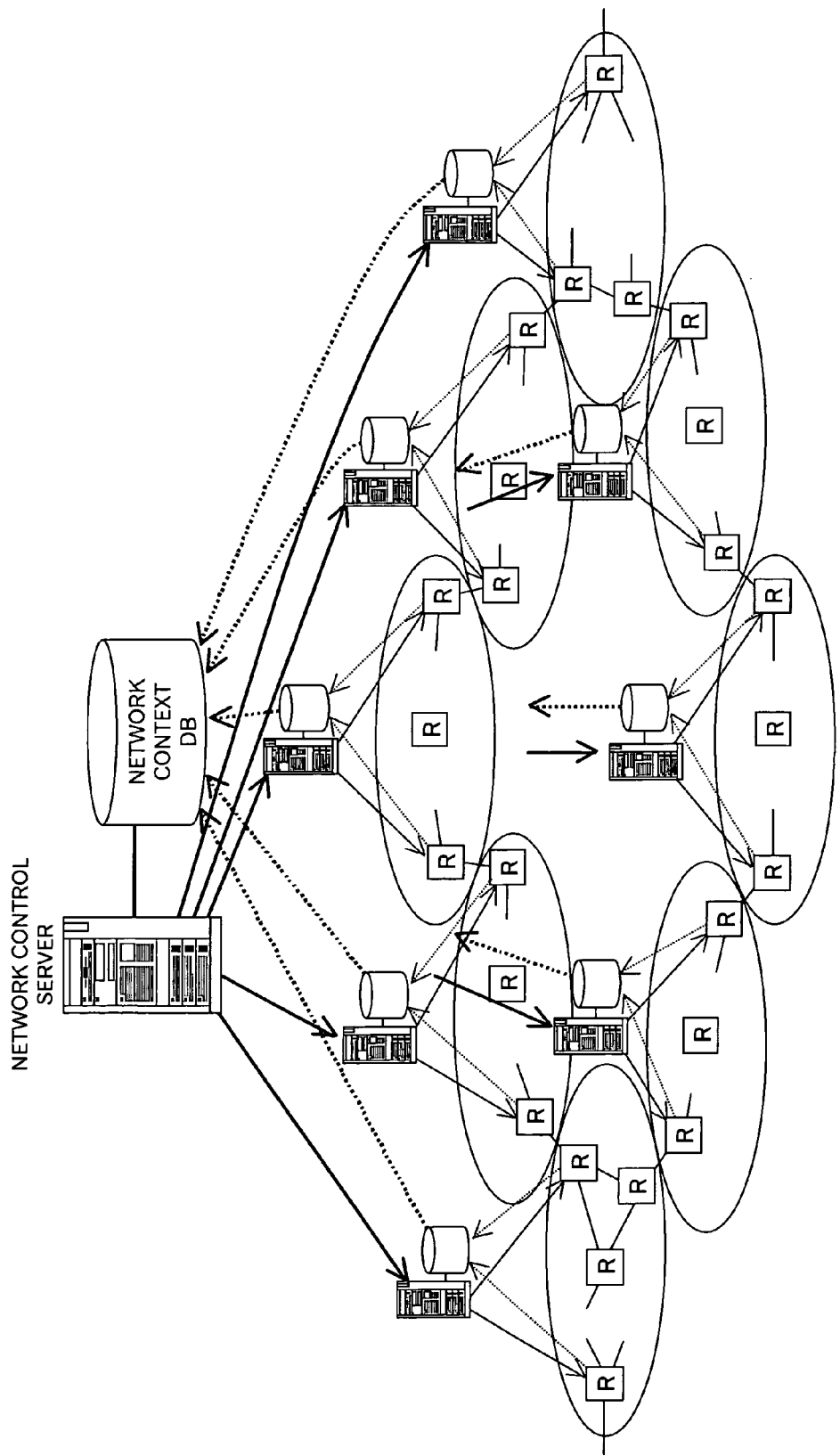
FIG. 22 is a conceptual diagram showing a hierarchical network control model.

As shown in FIG. 1, a centralized network control system for controlling all routings by a single network control server provided for all networks may be used. In the light of the application to a large network, however, the server is likely to be a performance bottleneck. Therefore, it is preferable in scalability to use an architecture that can be controlled and managed in units of a sub-network by dividing the network control management unit into a plurality of sub-networks. More specifically, as shown in FIG. 22, it is preferable to use a hierarchical network control system, in which a network control server is provided for each predetermined sub-network and further a network control server that bundles the network control servers for each sub-network is provided on the higher level separately. Depending on circumstances, the network control servers may be provided in such a way as to have a three or more layered hierarchical structure.

In this instance, the higher-level network control server for controlling the entire sub-networks carries out a sub-network selection, thereby selecting a sub-network, namely, a backbone path. Subsequently, the network control server for each sub-network dispersedly searches for a path between corresponding sub-networks, which is between routers at the connection points between the sub-networks.

The following describes that the network with the aforementioned hierarchical structure provided by dividing the network control management unit enables a higher performance. With the division in units of a sub-network, a workload that has to be processed by one server is basically divided. The work processed by the higher-level network control server is not intended for the nodes of the entire network, but is intended for information summarized in units of a sub-network, and therefore the workload is remarkably lower than the centralized network control system. The processes governing the performance of the network control server include a context collection process for collecting information of the state from the network device and a path search process for determining a path using the information. It will now be described that the processing time in the context collection process can be reduced by the hierarchical structure.

Figures 23, 24:
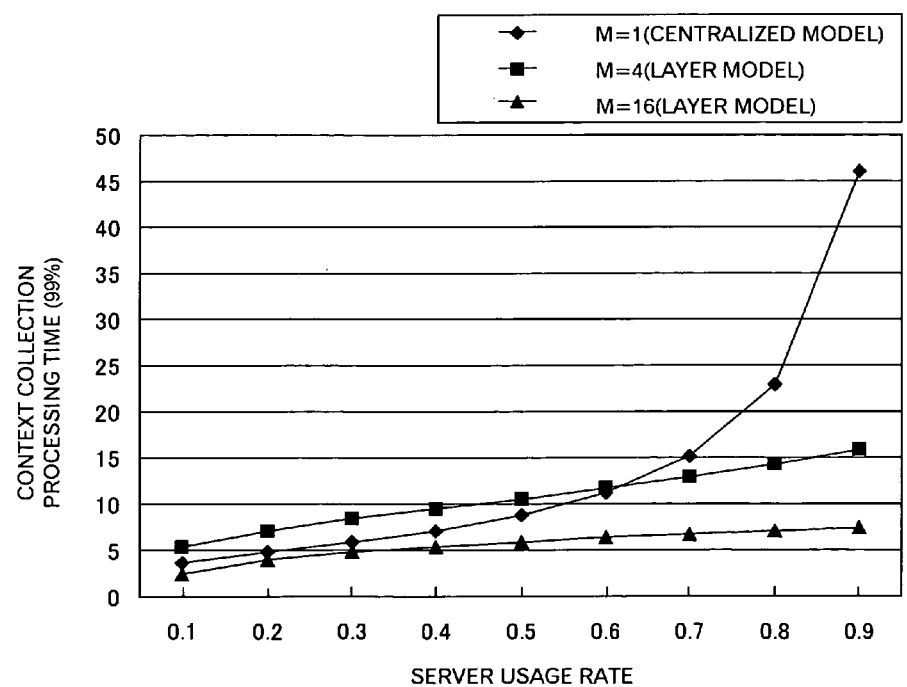
FIG. 23 is a diagram showing a performance evaluation model of a hierarchical network control mechanism.
FIG. 24 is a diagram showing a performance evaluation result of the hierarchical network control mechanism.

Note here that N is the total number of nodes, M is the number of subnets (for simplification, $M=m^2$ is assumed here), and $N/M=N/m^2$ is (the number of nodes)/(the number of subnets). The relation of the hierarchical control model with the centralized control model is as shown in FIG. 23, regarding the arrival rate of a collected context, computational complexity, server's computing power, holding time (service time) for single processing, and a server utilization rate for each of the high-level network control server and the network control server within a subnet. It is supposed here that the computational complexity is proportional to the number of entities sending context information. Regarding the distribution of the server's computing power, it is supposed that power rP (here r is defined as $0<r<1$) is allocated to the high-level network control server and the remaining power (1−r)P is allocated to the network control servers of M subnetworks, where P is the server's power of the centralized control model.

Furthermore, FIG. 24 shows the result in which the relation between the server utilization rate and the delay time of the context collection processing is calculated in terms of a queuing model M/M/1, regarding each of the centralized control model (M=1), the hierarchical control model where M=4, and the hierarchical control model where M=6. As shown, when the server utilization rate increases, the delay time becomes longer in the centralized control model or in the hierarchical control model having the smaller number M of subnets, so as to be impractical. Incidentally, although the path search processing time model will be described later, much the same is true on it.

Figure 28:
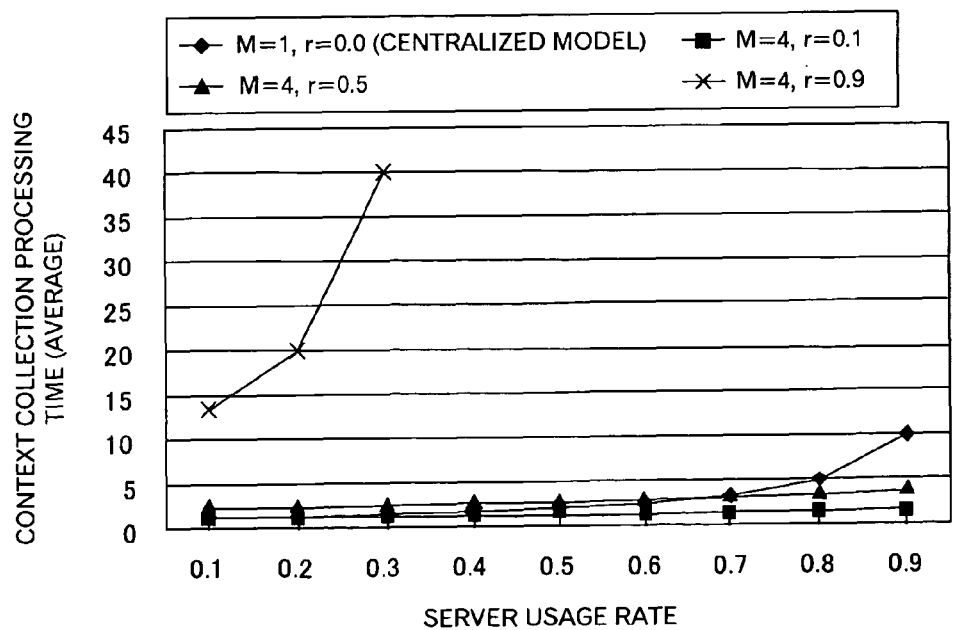
FIG. 28 is a diagram showing an evaluation result of the computer resource allocation in the hierarchical network control mechanism.

Furthermore, FIG. 28 shows how computer resources equivalent to the server's power of the centralized control model P should be distributed to the servers of the hierarchical control model where M=4. When almost all the computing power is allocated to the high-level network control server with r=0.9, the computing power of only r=0.1 can be allocated to all the network control servers of the sub-networks. Furthermore, the computer resource of only one M-th can be allocated to the server of each sub-network. Therefore, as apparent from FIG. 23, even if the computational complexity is divided by M (4 in this case), the server utilization rate is higher than that of the centralized control model due to the low computing power. Accordingly, as shown in FIG. 28, the context collection processing time rapidly increases during the period of lower server utilization rates as the criterion of the centralized control model. Compared to this, when the ratio of the allocation to the network control servers of the sub-networks is increased by decreasing r like r=0.5 and r=0.1, sufficient computing power is allocated for the computational complexity divided into M (4 in this case), whereby the context collection processing time can be remarkably lower than the centralized control model. At this time, conversely the processing time of the high-level network control server increases, but the increment is relatively very low and therefore the increase does not have effect on the performance. Basically, regarding the server utilization rate or the service time shown in FIG. 23 or described with reference to FIG. 29, the performance of the hierarchical control model can be superior to the centralized control model by determining M or r in such a way that those values are lower than the values of the centralized control model.

The following describes a path search process model for determining a path by using context information, which is the other process governing the performance of the network control server. Similarly to the context collection process, N is the total number of nodes, M is the number of subnets (for simplification, $M=m^2$ is assumed here), and $N/M=N/m^2$ is (the number of nodes)/(the number of subnets). The relation of the hierarchical control model with the centralized control model is as shown in FIG. 29, regarding the arrival rate of a path search request, computational complexity, server's computing power, holding time for single processing (service time) and a server utilization rate for each of the high-level network control server and the network control server within a subnet. It is supposed here that m is the number of subnets involved in a single path search request and therefore the arrival rate of the path search request within the subnet is 1/m of the entire arrival rate. Regarding the distribution of the server's computing power, it is supposed that power rP (here r is defined as 0<r<1) is allocated to the high-level network control server and the remaining power (1−r) P is allocated to the network control servers of M sub-networks, where P is the server's power of the centralized control model. In addition, the required computational complexity of the path search is defined as shown in FIG. 29, since it is known that the computational complexity of Dijkstra algorithm is nlog(n) where n is the number of nodes.

As described above, regarding the server utilization rate or the service time shown in FIG. 29, the performance of the hierarchical control model can be superior to the centralized control model by determining M or r in such a way that those values are lower than the values of the centralized control model.

Although the embodiment of this invention is described, this invention is not limited to this. For example, functional blocks shown in FIG. 1, and the configuration of actual program modules may be different from the functional blocks.

Figure 25:
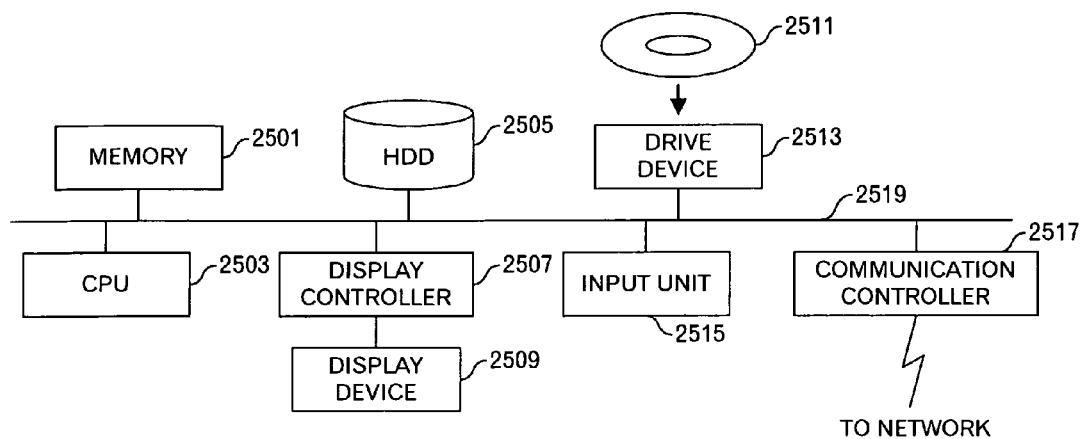
FIG. 25 is a functional block diagram of a computer.
Figure 26:
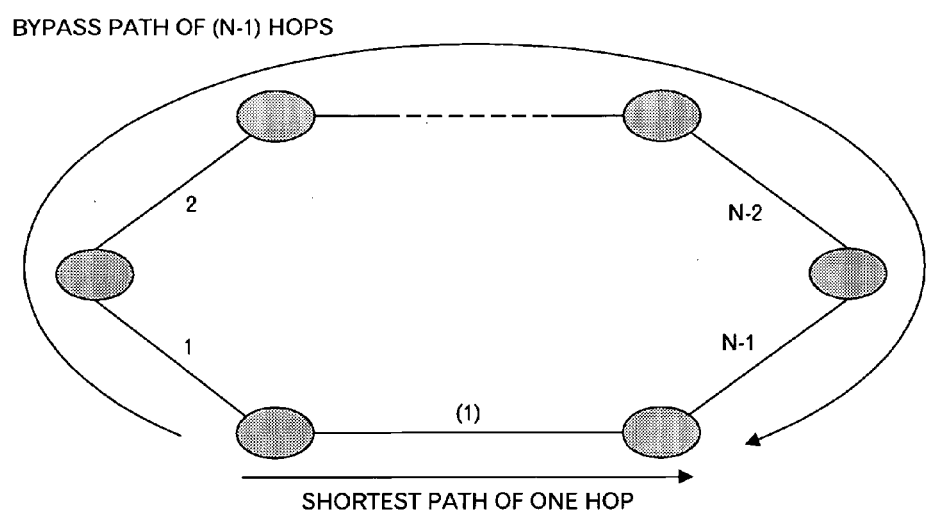
FIG. 26 is a diagram showing a model network to explain a difference in the resource utilization efficiency due to the path selection.
Figure 27:
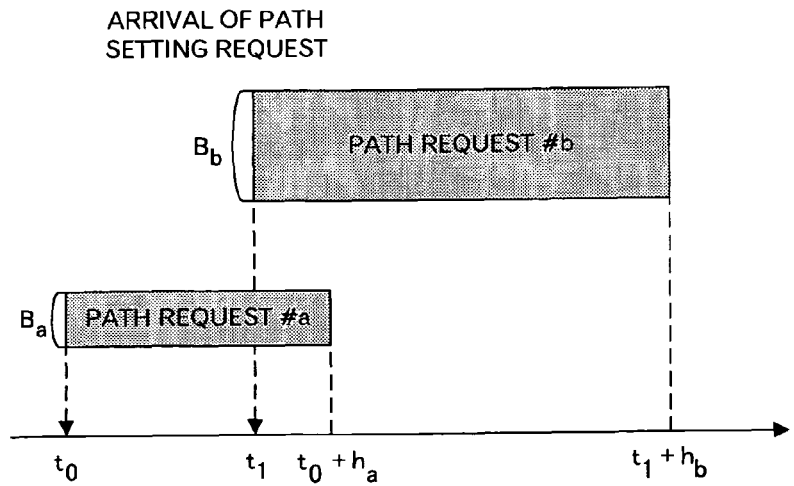
FIG. 27 is a diagram showing an example of path requests to explain a difference in the resource utilization efficiency due to the path selection.

In addition, the network control server 5 is a computer device as shown in FIG. 25. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A routing control method, comprising:

providing an apparatus comprising a minimum cost path search processor and a predicted utilization transition data storage storing predicted utilization transition data in future for each resource in a network;

said minimum cost path search processor reading out predicted utilization transition data associated with a received connection set-up request from said predicted utilization transition data storage;

said minimum cost path search processor selecting a resource satisfying a predetermined condition; and said minimum cost path search processor detecting an arrival of a communication request for a large amount of traffic whose bandwidth or holding time is greater than a predetermined value, based on said predicted utilization transition data, and wherein said selecting comprises:
obtaining a cost of each said resource for a communication request for traffic other than said large amount of traffic based on said predicted utilization transition data relating to said arrival of said communication request for said large amount of traffic to select a first resource satisfying a second predetermined condition including a condition that a cost of said first resource is other than a minimum cost; and
obtaining a cost of each said resource for said communication request for said large amount of traffic by using current utilization status data for each resource of said network, which is stored in a network context data storage, or by using static attribute information stored in a network data storage to select a second resource satisfying a third predetermined condition including a condition that a cost of said second resource is said minimum cost.

2. The routing control method as set forth in claim 1, wherein said selecting comprises identifying a value representing the strictest predicted utilization status in a period associated with said connection set-up request, in said read predicted utilization transition data.

3. The routing control method as set forth in claim 2, wherein said period associated with said connection set-up request is a predicted communication holding period.

4. The routing control method as set forth in claim 1, said apparatus further comprising a traffic transition predictor, and
said routing control method further comprising:
said traffic transition predictor generating predicted utilization transition data in future for each said resource of said network from past utilization status data for said each resource of said network, which is stored in said network context data storage, and storing said predicted utilization transition data into said predicted utilization transition data storage.

5. The routing control method as set forth in claim 1, wherein said predicted utilization transition data storage stores said predicted utilization transition data and identification information of a server associated with said predicted utilization transition data or identification information of an edge router associated with said predicted utilization transition data, and
said reading comprises identifying said predicted utilization transition data applied at least according to a connection destination address of said connection set-up request.

6. The routing control method as set forth in claim 5, wherein said identifying comprises:
detecting that identification information of a server identified from a connection destination address of said connection set-up request, or identification information of an edge router identified from a connection destination address of said connection set-up request is registered for a specific resource in association with said predicted utilization transition data in said predicted utilization transition data storage; and
identifying another predetermined data for said specific resource as said predicted utilization transition data without using the corresponding predicted utilization transition data.

7. The routing control method as set forth in claim 5, wherein said identifying comprises:
detecting that identification information of a server identified from a connection destination address of said connection set-up request, or identification information of an edge router identified from a connection destination address of said connection set-up request is not registered for a specific resource in association with said predicted utilization transition data in said predicted utilization transition data storage; and
identifying said predicted utilization transition data for said specific resource.

8. The routing control method as set forth in claim 6, wherein said another predetermined data is one of current utilization status data, data representing no load, and static attribute information.

9. The routing control method as set forth in claim 1, said apparatus further comprising a traffic transition predictor and a change pattern data storage, and
said routing control method further comprising:
said traffic transition predictor generating first predicted utilization transition data for each said resource of said network by using at least one of periodic change pattern data of a utilization status, non-periodic event change pattern data of said utilization status, and long-term change pattern data of said utilization status, which are generated in advance for each said resource of said network and stored in said change pattern data storage.

10. The routing control method as set forth in claim 9, further comprising:
said traffic transition predictor generating second predicted utilization transition data by modifying the generated first predicted utilization transition data so as to be identical with current utilization status data for each said resource of said network, which is stored in said network context data storage.

11. The routing control method as set forth in claim 10, further comprising:
said traffic transition predictor generating third predicted utilization transition data by modifying the generated second predicted utilization transition data in accordance with a physical upper limit value of each said resource of said network.

12. The routing control method as set forth in claim 1, further comprising:
forcibly rejecting a new path setting request using a resource, while said resource is judged as being unstable based on a difference between a current value identified from said predicted utilization transition data and an actual value of current utilization status data.

13. The routing control method as set forth in claim 1, further comprising:
detecting that a resource is judged as being unstable based on a difference between a current value identified from said predicted utilization transition data and an actual value of current utilization status data; and
carrying out at least one of forcibly disconnecting a path already using said resource being unstable, switching traffic to another stable path, and discarding packets flowing through a path already using said resource being unstable, and
wherein said carrying out is continuously executed until said resource is judged as being stable.

14. A routing control apparatus, comprising:
a predicted utilization transition data storage device storing predicted utilization transition data in future for each resource in a network;
a first unit to read out predicted utilization transition data associated with a received connection set-up request from said predicted utilization transition data storage device;

a selection unit to select a route comprising resources satisfying a predetermined condition based on the read predicted utilization transition data; and a second unit to detect an arrival of a communication request for a large amount of traffic whose bandwidth or holding time is greater than a predetermined value, based on said predicted utilization transition data, and wherein said selection unit obtains a cost of each said resource for a communication request for traffic other than said large amount of traffic based on said predicted utilization transition data relating to said arrival of said communication request for said large amount of traffic to select a first resource satisfying a second predetermined condition including a condition that a cost of said first resource is other than a minimum cost; and said selection unit obtains a cost of each said resource for said communication request for said large amount of traffic by using current utilization status data for each resource of said network, which is stored in a network context data storage, or by using static attribute information stored in a network data storage to select a second resource satisfying a third predetermined condition including a condition that a cost of said second resource is said minimum cost.

15. A layered type routing control system, comprising:
said routing control apparatus as set forth in claim 14 for each subnetwork;
a second routing control apparatus that carries out a processing to control a route between subnetworks by managing said routing control apparatuses.

16. The layered type routing control system as set forth in claim 15, wherein a computational resource is allocated to said routing control apparatuses and said second routing control apparatus in accordance with a rate determined from a number N of all nodes to be controlled and managed and a number M of subnetworks.

17. A routing control method, comprising:
providing an apparatus comprising a request receiver, a path search processor, a predicted utilization transition data storage storing predicted utilization transition data in future for each resource in a network, a network data storage and a network context data storage;

said request receiver receiving a connection set-up request; and said path search processor selecting a resource selection processing for said connection set-up request among a first processing, a second processing and a third processing, and wherein said first processing executed by said path search processor comprises: reading out predicted utilization transition data associated with the received connection set-up request from said predicted utilization transition data storage, and selecting a resource satisfying a first predetermined condition based on the read predicted utilization transition data, said second processing executed by said path search processor comprises: selecting a first resource satisfying a second predetermined condition by using data concerning a static attribute for each resource of said network and including a condition that a cost of said first resource is other than a minimum cost, said data concerning said static attribute stored in said network data storage, and said third processing executed by said path search processor comprises: selecting a second resource satisfying a third predetermined condition by using current utilization status data for each resource of said network and including a condition that a cost of said second resource is said minimum cost, said current utilization status data stored in said network context data storage.

18. The routing control method as set forth in 17, wherein said selecting said resource selection processing is executed when generating a conditional network topology graph corresponding to said received connection set-up request, or when searching a network topology graph for a path corresponding to said received set-up connection set-up request.

19. The routing control method as set forth in 17, wherein said selecting said resource selection processing is carried out when generating a conditional network topology graph, and
said first, second or third predetermined condition comprises a condition in which a maximum value of a utilization rate in a period associated with said connection set-up request is equal to or less than a threshold, when said predetermined utilization transition data is said utilization rate, or a condition in which a minimum value of an available bandwidth in said period associated with said connection set-up request is equal to or greater than a threshold, when said predetermined utilization transition data is said available bandwidth.

20. The routing control method as set forth in 17, wherein said selecting said resource selection processing is carried out when generating a conditional network topology graph, and
said predetermined condition comprises a condition in which a difference between a current value identified from said predicted utilization transition data and an actual value of current utilization status data or a link cost that is a time integral value of said difference is within a threshold range.

21. The routing control method as set forth in claim 17, wherein said selecting said resource selection processing is carried out when carrying out a path search, and
said predetermined condition comprises a condition in which a minimum cost path is searched by using, as a cost, a delay time converted from a utilization rate in said predicted utilization transition data when carrying out a minimum delay path search taking into account a predicted transition.

22. The routing control method as set forth in claim 17, wherein said selecting said resource selection processing is carried out when carrying out a path search, and
said predetermined condition comprises a condition in which a minimum cost path is searched by using, as a link cost, a difference between a current traffic volume derived from said predicted utilization transition data and an actual current traffic volume, or a time integral value of said difference, when carrying out a maximum stability path search taking into account a predicted transition.

* * * * *

UNITED STATES PATENT AND TRADEMARK OFFICE
CERTIFICATE OF CORRECTION

PATENT NO. : 7,746,789 B2
APPLICATION NO. : 11/390411
DATED : June 29, 2010
INVENTOR(S) : Masafumi Katoh et al.

It is certified that error appears in the above-identified patent and that said Letters Patent is hereby corrected as shown below:

Column 34, Line 11, change "17," to --claim 17,--.

Column 34, Line 17, change "17," to --claim 17,--.

Column 34, Line 30, change "17" to --claim 17,--.

Signed and Sealed this

Sixteenth Day of November, 2010

David J. Kappos
*Director of the United States Patent and Trademark Office*